United States Patent
Ahn et al.

(10) Patent No.: US 10,963,563 B2
(45) Date of Patent: Mar. 30, 2021

(54) METHOD AND SYSTEM FOR EVALUATING SECURITY OF APPLICATION

(71) Applicant: LINE Corporation, Tokyo (JP)

(72) Inventors: Sungbeom Ahn, Seongnam-si (KR); Myungju Chung, Seongnam-si (KR); Tae Woo Kim, Seongnam-si (KR); Sang Min Chung, Seongnam-si (KR); Seong Yeol Lim, Seongnam-si (KR); SangHun Jeon, Seongnam-si (KR); Kwang-Hee Han, Seongnam-si (KR); Dongpil Seo, Seongnam-si (KR); Joo Hyeon Ryu, Seongnam-si (KR)

(73) Assignee: LINE Corporation, Tokyo (JP)

( * ) Notice: Subject to any disclaimer, the term of this patent is extended or adjusted under 35 U.S.C. 154(b) by 118 days.

(21) Appl. No.: 15/958,115

(22) Filed: Apr. 20, 2018

(65) Prior Publication Data
US 2018/0307837 A1  Oct. 25, 2018

Related U.S. Application Data

(63) Continuation of application No. PCT/KR2017/006903, filed on Jun. 29, 2017, and a
(Continued)

(51) Int. Cl.
*H04L 29/06* (2006.01)
*G06F 21/56* (2013.01)
(Continued)

(52) U.S. Cl.
CPC ............ *G06F 21/563* (2013.01); *G06F 21/14* (2013.01); *G06F 21/54* (2013.01); *G06F 21/6218* (2013.01); *G06F 2221/2107* (2013.01)

(58) Field of Classification Search
CPC ........ G06F 21/563; G06F 21/54; G06F 21/14; G06F 21/6218; G06F 2221/2107
See application file for complete search history.

(56) References Cited

U.S. PATENT DOCUMENTS 6,668,325 B1    12/2003 Collberg et al.
9,223,961 B1 *  12/2015 Sokolov .................. G06F 21/51
(Continued)

FOREIGN PATENT DOCUMENTS

KR     10-2012-0120686 A   11/2012
KR     10-1203245 B1       11/2012
(Continued)

*Primary Examiner* — Trong H Nguyen
(74) *Attorney, Agent, or Firm* — Harness, Dickey & Pierce, P.L.C.

(57) ABSTRACT

Provided are methods and/or systems for evaluating security of an application. A security evaluation method including storing pattern-information-by-perspective for analyzing a file package based on an obfuscation perspective and a vulnerability perspective, receiving a registration on the file package to be distributed to users for installing and executing an application, analyzing the registered file package based on the pattern-information-by-perspective and generating analysis information of the obfuscation perspective and analysis information of the vulnerability perspective, and providing the generated analysis information of the obfuscation perspective and the analysis information of the vulnerability perspective may be provided.

18 Claims, 46 Drawing Sheets

Related U.S. Application Data continuation of application No. PCT/KR2017/004584, filed on Apr. 28, 2017, and a continuation of application No. PCT/KR2017/004243, filed on Apr. 20, 2017, and a continuation of application No. PCT/KR2017/004236, filed on Apr. 20, 2017.

(51) Int. Cl.
*G06F 21/62* (2013.01)
*G06F 21/14* (2013.01)
*G06F 21/54* (2013.01)

(56) References Cited

U.S. PATENT DOCUMENTS

| | | | | |
|---|---|---|---|---|
| 9,652,617 | B1* | 5/2017 | Evans | G06F 21/57 |
| 2006/0090192 | A1* | 4/2006 | Corby | G06F 21/51 |
| | | | | 726/1 |
| 2011/0145921 | A1* | 6/2011 | Mathur | G06F 21/52 |
| | | | | 726/23 |
| 2012/0072968 | A1* | 3/2012 | Wysopal | G06F 11/3612 |
| | | | | 726/1 |
| 2017/0006045 | A1* | 1/2017 | Kivva | G06F 21/561 |

FOREIGN PATENT DOCUMENTS

| | | | |
|---|---|---|---|
| KR | 10-2014-0029562 | A | 3/2014 |
| KR | 10-1490047 | B1 | 2/2015 |
| KR | 10-2015-0044490 | A | 4/2015 |
| KR | 10-1628837 | B1 | 6/2016 |
| KR | 10-2016-0117183 | A | 10/2016 |
| KR | 10-2016-0118920 | A | 10/2016 |
| KR | 10-1667774 | B1 | 10/2016 |
| KR | 10-1700731 | B1 | 1/2017 |
| KR | 10-2017-0018744 | A | 2/2017 |
| KR | 10-1715179 | B1 | 3/2017 |
| KR | 10-1720686 | B1 | 3/2017 |
| KR | 10-2017-0036392 | A | 4/2017 |

* cited by examiner

| type | name | dangerous grade | detected log |
|---|---|---|---|
| vulnerability | OpenSSL (CVE-2016-2108) | CRITICAL | file: /tmp/airgo/airgo/lib/armeabi-v7a/libUE4.so |
| | | | OpenSSL 1.0.1f |
| vulnerability | OpenSSL (CVE-2016-2107) | CRITICAL | file: /tmp/airgo/airgo/lib/armeabi-v7a/libUE4.so |
| | | | OpenSSL 1.0.1f |
| vulnerability | OpenSSL (CVE-2016-0800) | CRITICAL | file: /tmp/airgo/airgo/lib/armeabi-v7a/libUE4.so |
| | | | OpenSSL 1.0.1f |
| vulnerability | OpenSSL (CVE-2016-0703) | CRITICAL | file: /tmp/airgo/airgo/lib/armeabi-v7a/libUE4.so |

Class:AppsealingSecurityClass method:.cctor method:.ctor

Class:AppSealingSecurityMethod method:.cctor method:.ctor

| name | dangerous grade | detected log |
|---|---|---|
| /assets/bin/Data/Managed/Assembly-CSharp.dll | WARNING | MethodCrypted=yes |
| | | TotalClassNum=23 |
| | | TotalMethodNum=23 |
| | | TotalObfuscatedClassNum=2 |
| | | TotalObfuscatedMethodNum=7 |

| type | name | dangerous grade | detected log |
|---|---|---|---|
| obfuscation | /lib/armeabi/libopenal.so | SAFE | sectionHeader=yes |
| | | | strings=no |
| | | | stringTable=no |
| | | | symbolTable=yes |
| | | | codepacking=yes |
| | | | codebfuscation=no |

| name | dangerous grade | detected log |
|---|---|---|
| /assets/arm64-v8a/libnmscrash64-v1.so | CRITICAL | sectionHeader=no |
| | | strings=no |
| | | stringTable=no |
| | | symbolTable=no |
| | | codepacking=no |
| | | codebfuscation=no | ated security of an application uploaded to Appstore, and discloses a technology for rejecting entry of a corresponding application (e.g., rejecting registration of a corresponding application) to Appstore in response to detecting a malicious code in the application to be registered to the Appstore.
METHOD AND SYSTEM FOR EVALUATING SECURITY OF APPLICATION

CROSS-REFERENCE TO RELATED APPLICATION(S)

This U.S. non-provisional application is a continuation of, and claims the benefit of priority under 35 U.S.C. § 365(c) from International Patent Application No. PCT/KR2017/004236 filed on Apr. 20, 2017, International Patent Application No. PCT/KR2017/004243 filed on Apr. 20, 2017, International Patent Application No. PCT/KR2017/004584 filed on Apr. 28, 2017, and International Patent Application No. PCT/KR2017/006903 filed on Jun. 29, 2017, in the World Intellectual Property Organization (WIPO), all of which designate the United States of America, the entire contents of all of which are incorporated herein by reference.

BACKGROUND

Field

One or more example embodiments relate to methods and/or systems for supporting security of an application.

Description of Related Art

Appstore refers to an online content market that sells a variety of applications loadable to a terminal such as a smartphone. For example, a developer of an application may register a file (e.g., an Android Application Package (APK)) for installing a developed application on a terminal to Appstore, and a user of the application may download the file for the application, and install and run the application on a terminal of the user. Also, various game applications such as a game publisher may be distributed to users. That is, application publishers may receive a registration on various applications not directly developed by the application publishers, and may distribute the registered applications to the users.

Here, dangers of an application may be discussed in various perspectives.

For example, a first danger of the application may refer to a danger in a case in which the application includes information, such as a malicious code, developed with a malicious intent, and performs a malicious function on an application publisher to which the application is registered or terminals of users on which the application is installed and executed. Korean Patent Open-Laid Publication No. 10-2014-0098025 relates to a system and method for evaluating security of an application uploaded to Appstore, and discloses a technology for rejecting entry of a corresponding application (e.g., rejecting registration of a corresponding application) to Appstore in response to detecting a malicious code in the application to be registered to the Appstore.

As another example, a second danger of the application may refer to a danger to the security of the application itself. If a source code of a distributed application is changed or modified through analysis of the distributed application, the application may perform other functions instead of performing functions originally intended by a developer, which may reduce reliability of a service desired to be provided through the application. Accordingly, application publishers are desired to provide a certain level of security for applications when distributing various applications (e.g., installation files of applications) not directly developed by the application publishers.

However, regarding the second danger of the application, a level of security provided for each registered application may differ. For example, security solutions with different levels of security may be installed on the respective applications. Here, any security measures may not be included in the applications. Also, each of the security solutions installed on the applications may provide a different level of security.

In the related art, a vulnerability inspection of a Java end may be simply performed at a level of a programming language level (e.g., an APK). That is, on the side of an application publisher, it may be difficult to provide security that is maintained at a certain level or more with respect to each of a large number of registered applications.

SUMMARY

One or more example embodiments provide security evaluation methods and/or systems that may objectively analyze and verify a level of security applied to a registered application based on a perspective of each of an obfuscation, a vulnerability, and a security solution, and may provide the analyzed information to be available for security enhancement of the application on the side of an application publisher.

One or more example embodiments also provide security evaluation methods and/or systems that may determine whether an obfuscation is applied to a dex file included in an Android Application Package (APK).

One or more example embodiments also provide security evaluation methods and/or systems that may determine whether an obfuscation is applied to an Executable and Linkable Format (ELF) file.

One or more example embodiments also provide security evaluation methods and/or systems that may determine whether an obfuscation is applied to a Portable Executable (PE) file.

According to an aspect of at least one example embodiment, a method of evaluating security of an application may include storing pattern-information-by-perspective for analyzing a file package based on an obfuscation perspective and a vulnerability perspective, registering the file package to be distributed to users for installing and executing an application, analyzing the registered file package based on the pattern-information-by-perspective, generating analysis information of the obfuscation perspective and analysis information of the vulnerability perspective based on results of the analyzing, and providing the analysis information of the obfuscation perspective and the analysis information of the vulnerability perspective.

According to an aspect of at least one example embodiment, a system for evaluating security of an application may include at least one processor configured to execute non-transitory computer-readable instructions such that the at least one processor are configured to store pattern-information-by-perspective for analyzing a file package based on an obfuscation perspective and a vulnerability perspective, register the file package to be distributed to users for installing and executing an application, analyze the registered file package based on the pattern-information-by-perspective and generate analysis information of the obfuscation perspective and analysis information of the vulnerability perspective based on a analyzed result, and provide the generated analysis information of the obfuscation perspective and the analysis information of the vulnerability perspective.

According to an aspect of at least one example embodiment, a non-transitory computer-readable recording medium storing instructions that, when executed by a processor, cause the processor to perform the aforementioned security evaluation method.

According to some example embodiments, it is possible to objectively analyze and verify a level of security applied to a registered application based on a perspective of each of an obfuscation, a vulnerability, and a security solution, and to provide the analyzed information to be available for security enhancement of the application from a viewpoint of an application publisher.

Further, according to some example embodiments, it is possible to determine whether an obfuscation is applied to a dex file included in an APK.

Further, according to some example embodiments, it may be possible to determine whether an obfuscation is applied to an ELF file.

Further, according to some example embodiments, it may be possible to determine whether an obfuscation is applied to a PE file.

Further areas of applicability will become apparent from the description provided herein. The description and specific examples in this disclosure are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein:

FIG. 5 illustrates an example of analysis information of a vulnerability perspective according to at least one example embodiment;

FIG. 6 illustrates an example of a class and a method included in a parsed dll file according to at least one example embodiment;

FIG. 7 illustrates an example of analysis information of an obfuscation perspective based on a class and a method that are identified from a parsed dll file according to at least one example embodiment;

FIG. 8 illustrates an example of analysis information of an obfuscation perspective with respect to a parsed so file according to at least one example embodiment;

FIG. 9 illustrates another example of analysis information of an obfuscation perspective with respect to a parsed so file according to at least one example embodiment;

Figure 1:
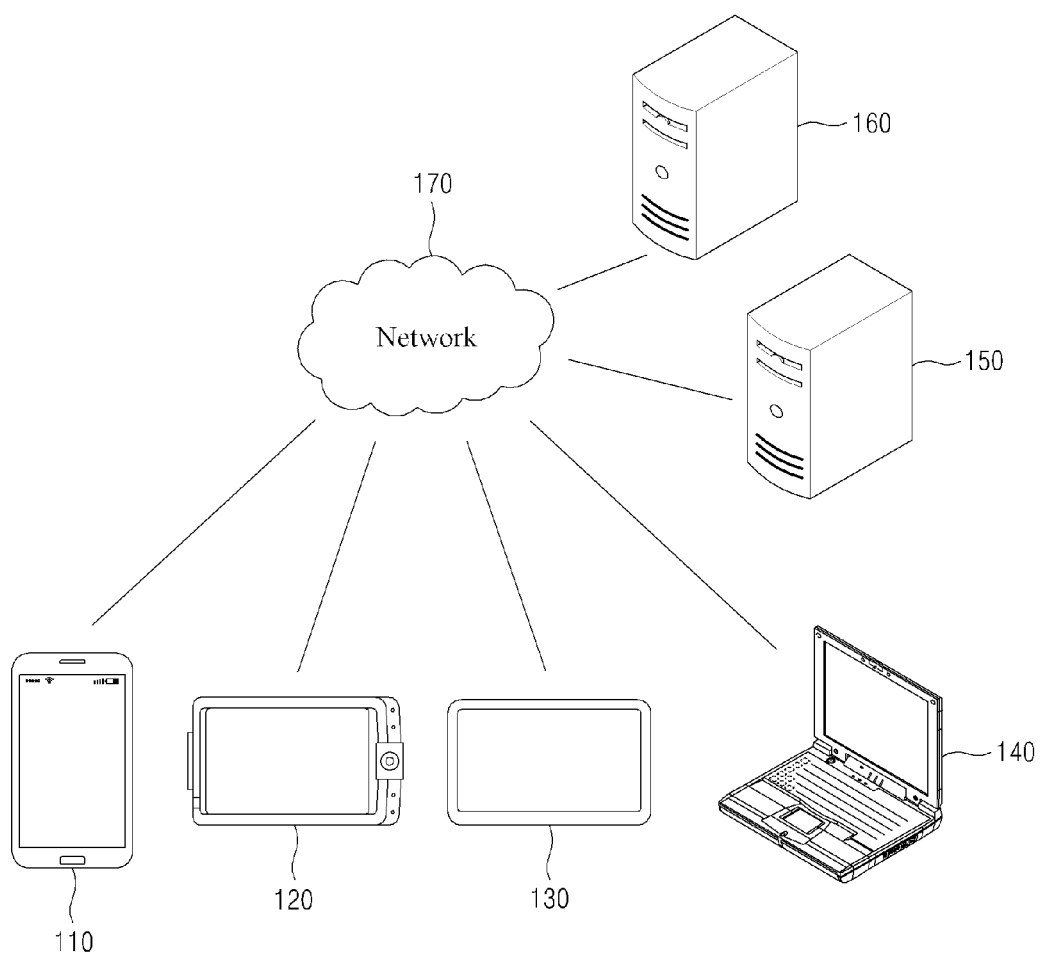
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU, a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

A security evaluation system according to example embodiments may be configured through a server, which is described below. A security evaluation method according to the example embodiments may be performed through the server. For example, a computer program according to the example embodiments may be installed and executed on the server. The server may perform the security evaluation method under control of the executed computer program. The computer program may be combined with the server configured as a computer and stored in a non-transitory computer-readable recording medium to execute the security evaluation method on the computer.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, a number of electronic devices and/or a number of servers are not limited thereto.

Each of the plurality of electronic devices 110, 120, 130, and 140 may be a fixed terminal or a mobile terminal configured as a computer device. In some example embodiments, the plurality of electronic devices 110, 120, 130, and 140 may be a smartphone, a mobile phone, a navigation, a computer, a laptop computer, a digital broadcasting terminal, a personal digital assistant (PDA), a portable multimedia player (PMP), or a tablet personal computer (PC). In some example embodiments, the electronic device 110 may be configured to communicate with other electronic devices 120, 130, and/or 140, and/or the servers 150 and/or 160 over the network 170 in a wired communication manner or in a wireless communication manner.

The communication scheme is not particularly limited and may include a communication method that uses a near field communication between devices as well as a communication method using a communication network (e.g., a mobile communication network, the wired Internet, the wireless Internet, a broadcasting network, and/or a satellite network), which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and/or 140 over the network 170. For example, the server 150 may be a system that provides a first service to the plurality of electronic devices 110, 120, 130, and/or 140 connected over the network 170.

The server 160 may be a system that provides a second service to the plurality of electronic devices 110, 120, 130, and/or 140 connected over the network 170. In some example embodiments, the server 150 may be at least a portion of apparatuses that constitute a system of an application publisher, and may provide, as the first service, a service that receives a registration on a file package of an application installed and run on the plurality of electronic devices 110, 120, 130, and/or 140, and distributes the registered application. As another example, the server 160 may provide, as the second service, a service associated with an application to the plurality of electronic devices 110, 120, 130, and/or 140 that installs and runs the application through the distributed file package.

Figure 2:
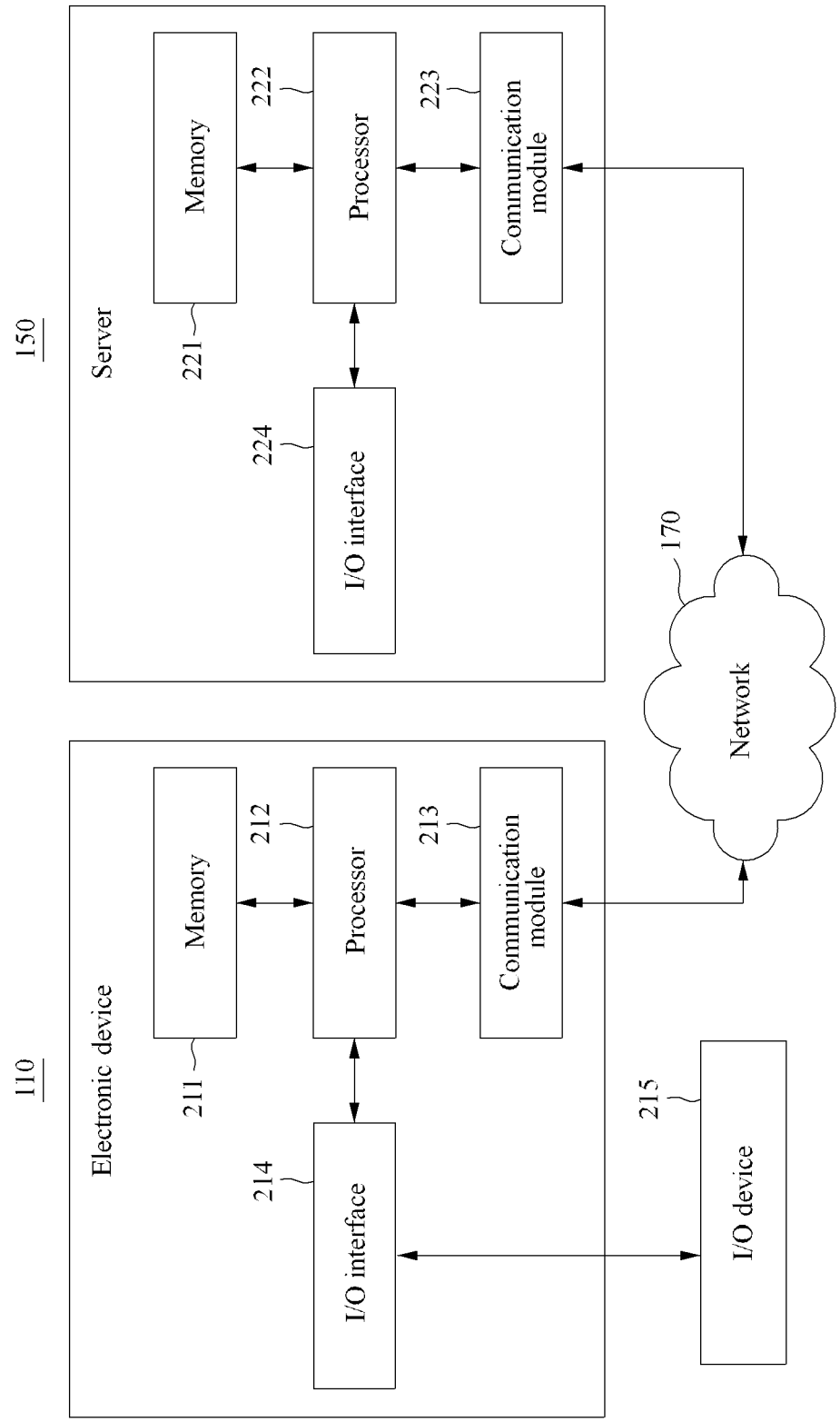
FIG. 2 is a block diagram illustrating a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The same or similar components may be applicable to other electronic devices 120, 130, and/or 140, or the server 160, and also to still other electronic devices or still other servers.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), read only memory (ROM), a disk drive, a solid state drive, a flash memory, etc., as a non-transitory computer-readable storage medium. Here, the permanent mass storage device (e.g., ROM and/or a disk drive) may be included in the electronic device 110 or the server 150 as a permanent storage device separate from the memory 211, 221. Further, an OS, at least one program code (e.g., a code for an application for providing a specific service installed on the electronic device 110), and/or a browser installed and executed on the electronic device 110 may be stored in the memory 211, 221. Such software components may be loaded from another non-transitory computer-readable storage medium separate from the memory 211, 221 using a drive mechanism. In some example embodiments, the non-transitory computer-readable storage medium may include a floppy drive, a disk, a tape, a DVD/CD-ROM drive, or a memory card. According to some other example embodiments, software components may be loaded to the memory 211, 221 through the communication module 213, 223, instead of or in addition to the non-transitory computer-readable storage medium. For example, at least one program may be loaded to the memory 211, 221 based on a program (e.g., the application) installed by files provided over the network 170 from developers or a file distribution system (e.g., the server 160), which provides an installation file of the application.

The processor 212, 222 may be configured to process computer-readable instructions of a computer program by performing basic arithmetic operations, logic operations, and/or I/O operations. The computer-readable instructions may be provided from the memory 211, 221 and/or the communication module 213, 223 to the processor 212, 222. For example, the processor 212, 222 may be configured to execute received instructions in response to the program code stored in the storage device (e.g., the memory 211, 222).

The communication module 213, 223 may support communication between the electronic device 110 and the server 150 over the network 170, and may support communication between the electronic device 110 and/or the server 150 and another electronic device (e.g., the electronic device 120 or another server such as the server 160). For example, the processor 212 of the electronic device 110 may transfer a request created based on a program code stored in the storage device such as the memory 211, to the server 150 over the network 170 under control of the communication module 213. Conversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and the content, the file, etc. may be stored in a storage medium further includable in the electronic device 110.

The I/O interface 214 may be a device used for interface with an I/O device 215. For example, an input device may include a keyboard, a mouse, a microphone, and/or a camera, and an output device may include a display for displaying a communication session of the application. As another example, the I/O interface 214 may be a device for interface with an apparatus in which an input function and an output function are integrated into a single function, such as a touch screen. The I/O device 215 may be configured as a single device with the electronic device 110. Also, the I/O interface 224 of the server 150 may be a device used for connection with the server 150 or for interface with a device (not shown) for input or output includable in the server 150. In some example embodiments, in response to processing instructions of the computer program loaded to the memory 211, the processor 212 of the electronic device 110 may display a service screen configured using data provided from the server 150 or the electronic device 120, or may display content on a display through the I/O interface 214.

According to other example embodiments, the electronic device 110 and the server 150 may include a greater or lesser number of components than a number of components shown in FIG. 2. However, there is no need to clearly illustrate many components according to the related art. For example, the electronic device 110 may include at least a portion of the I/O device 215, or may further include other components such as a transceiver, a global positioning system (GPS) module, a camera, a variety of sensors, and/or a database. In the case that the electronic device 110 is a smartphone, the electronic device 110 may further include a variety of components such as an accelerometer sensor, a gyro sensor, a camera module, various physical buttons, a button using a touch panel, an I/O port, and/or a vibrator for vibration.

Figure 3:
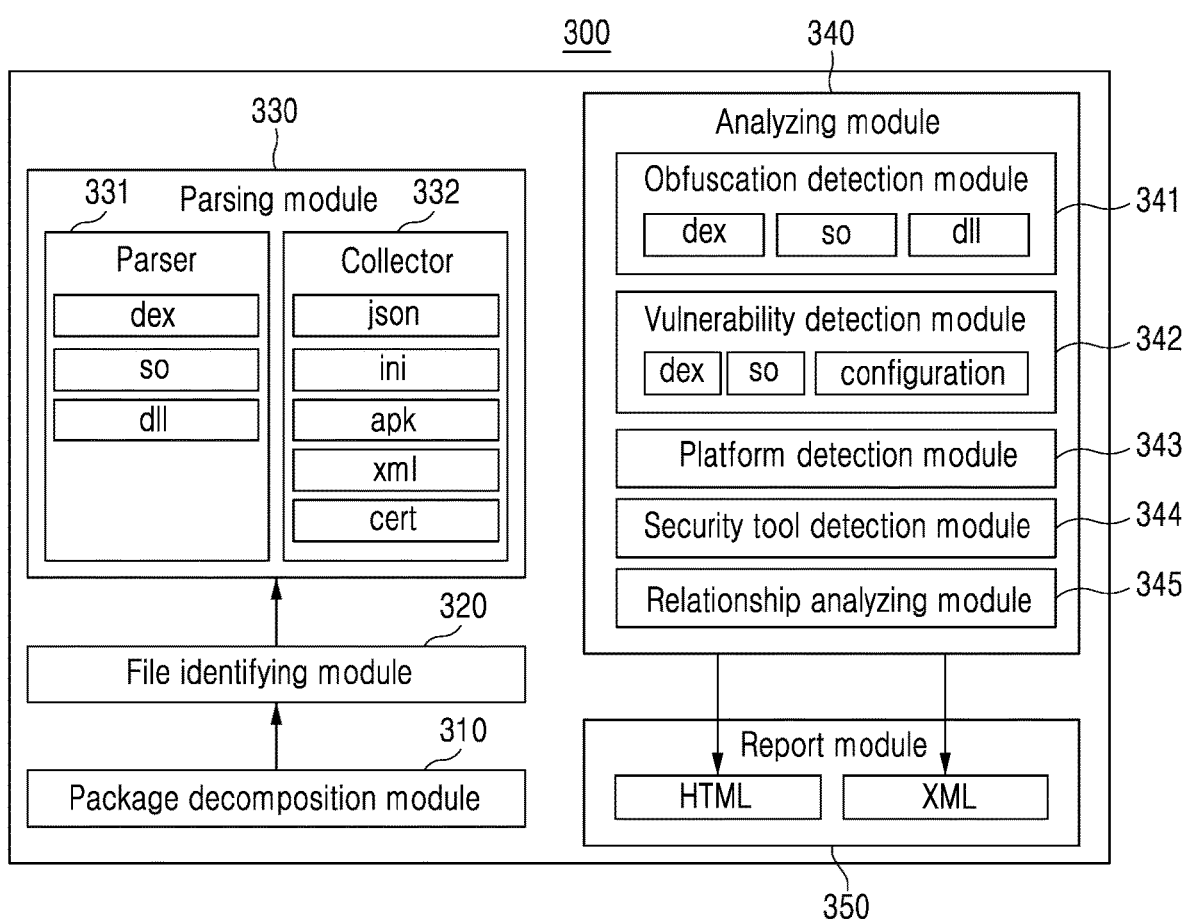
FIG. 3 is a block diagram illustrating a security evaluation system according to at least one example embodiment.

FIG. 3 is a block diagram illustrating a security evaluation system according to at least one example embodiment. A security evaluation system 300 of FIG. 3 may be configured through the server 150, and a package decomposition module 310, a file identifying module 320, a parsing module 330, an analyzing module 340, and a report module 350 included in the security evaluation system 300 may be representations of different functions of the processor 222 of the server 150.

For example, the package decomposition module 310 may be a function of the processor 222, and may be configured to decompose a file package in response to a control instruction included in a computer program. Here, a vulnerability detection module 342 included in the analyzing module 340 may be configured as a key module for vulnerability detection.

As described above, the server 150 may provide users with a file package of applications registered by developers.

Here, the package decomposition module 310 may decompose the registered file package. For example, an Android Application Package (APK) has an extension '.apk' as a file format of a file package that is used for distribution of software and middleware of Android that is a mobile operating system (OS). Although the example embodiments are described based on a file package such as the APK, it will be apparent to one of ordinary skill in the art that the same or similar features may be applicable to a different type of a file package from the following description.

Because the APK is well known, a description related to an APK file or files included in the APK file may be easily understood by one of ordinary skill in the art from the well-known arts. Accordingly, a further description related to the APK file or the files included in the APK file is omitted.

The file identifying module 320 may identify files included in the decomposed file package. Extensions (e.g., 'dex', 'so', 'dll', 'json', 'ini', 'apk', 'xml', 'cert') of FIG. 3 may be easily understood by one of ordinary skill in the APK-related arts art.

The parsing module 330 may parse the identified files. To this end, a parser 331 may parse files with a specific extension (e.g., 'dex', 'so', 'dll') among the identified files and a collector 332 may collect desired information from files with a specific extension (e.g., 'json', 'ini', 'apk', 'xml', 'cert').

For example, the parsing module 330 may identify each of classes and methods included in a 'dex' file, may track instructions included in a corresponding method, and may identify each of the instructions by classifying the instructions into a plurality of masses. The masses of the instructions may be classified based on a branch instruction such as a 'goto' statement, a 'switch' sentence, or an 'if' statement. Further, the parsing module 330 may generate and manage information associated with a call relationship between such instruction masses. For example, a call relationship between instruction masses may be managed using a tree structure, and information associated with the call relationship may include information associated with a method that is called by a specific instruction mass. Such generation and management of information may be processed with respect to each of the files included in a file package (e.g., an APK file). A parsing scheme may vary based on a characteristic of a file.

Parsed information and collected information may be transferred to the analyzing module 340.

The analyzing module 340 may generate and provide analysis information of each of an obfuscation perspective, a vulnerability perspective, and a security solution perspective with respect to a corresponding file package (or an application installed and executed on a user terminal (e.g., the electronic device 110) through the corresponding file package) based on the information that is transferred from the parsing module 330.

For example, an obfuscation detection module 341 may generate analysis information associated with a level of an obfuscation that is applied to files with a specific extension (e.g., 'dex', 'so', 'dll'). To this end, the obfuscation detection module 341 may determine whether the obfuscation is applied with respect to each item that is set or preset based on a type of a file.

Further, the vulnerability detection module 342 may generate analysis information associated with a vulnerability that is present in files with a specific extension (e.g., 'dex', 'so', or 'config' that is an extension of a configuration file). To this end, the security evaluation system 300 may manage information associated with known vulnerabilities and the vulnerability detection module 342 may generate analysis information regarding which vulnerability is set or present in which files based on information associated with the vulnerabilities.

Further, a platform detection module 343 may extract information associated with a platform on which a corresponding application is developed and/or the platform on which the corresponding application operates. For example, the security evaluation system 300 may use a different analysis scheme based on a platform (e.g., a development tool such as Unity or *Cocos*) on which a corresponding platform is developed.

Alternatively, because a file format included in the file package may vary for each platform on which an application operates, the security evaluation system 300 may use a different analysis scheme for each platform.

To this end, the security evaluation system 300 may extract platform information associated with the file package, and may analyze the file package based on the extracted platform information or may provide the extracted platform information to outside.

A security tool detection module 344 may detect a security solution inserted by a developer of the file package into the file package. For example, a first security tool provided in a library form by a third party may be added to a corresponding file package. In some example embodiments, a second security tool developed by a developer may be added to the corresponding file package by the developer. That is, the security tool detection module 344 may generate analysis information regarding whether the security tool is applied to the file package.

A relationship analyzing module 345 may generate analysis information associated with a reference relationship between files included in the file package. For example, if a first file includes a code for calling a second file, the relationship analyzing module 345 may generate analysis information to include information associated with a reference relationship between the first file and the second file.

The report module 350 may collect a plurality of pieces of analysis information generated by the analyzing module 340, and may generate a report to be provided to person(s) (e.g., an administrator of the server 150 or a security inspection team of an application publisher) concerned of the security evaluation system 300. The report may be provided to terminals of the concerned persons using Hypertext Markup Language (HTML) or eXtensible Markup Language (XML), as shown in the example of FIG. 3.

Figure 4:
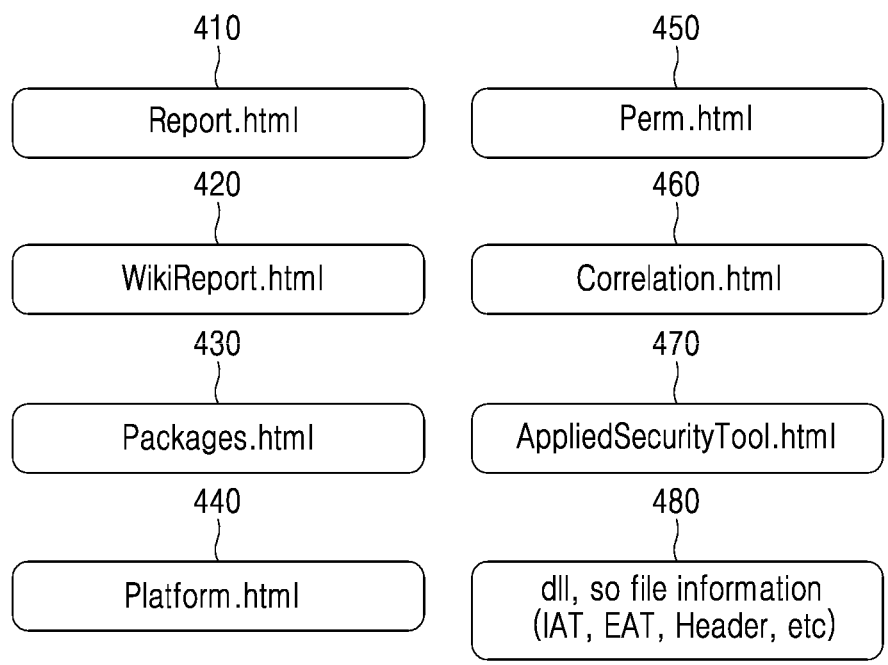
FIG. 4 illustrates an example of information included in a report to provide analysis information according to at least one example embodiment.

FIG. 4 illustrates an example of information included in a report to provide analysis information according to at least one example embodiment. FIG. 4 is provided as an example only to help understanding. Thus, an example of analysis information included in the report or a scheme of transferring the analysis information may vary depending on example embodiments.

For example, it may be easily understood by one of ordinary skill in the art that if a file format of a file package is not a file format for Android but a file format for another OS, information associated with files included in the file package or a configuration scheme thereof may vary based on the file format. Files 410, 420, 430, 440, 450, 460, 470, and 480 (410 through 480) may include template information used to arrange and represent information included in the corresponding files for a user.

The 'Report.html' file 410 may include information associated with the entire vulnerability grade of a target file package and information associated with a security tool applied to the corresponding file package.

The 'WikiReport.html' file 420 may include information associated with an obfuscation grade for each module or each file included in the file package and other information associated with an obfuscation.

The 'Packages.html' file 430 may include information associated with files (e.g., a plist file, a so file, an xml file, or a json file) included in the file package.

The 'Platfrom.html' file 440 may include information associated with a platform (e.g., a development tool such as Unity or Cocos), on which the corresponding file package is developed.

The 'Perm.html' file 450 may include information associated with a use list of Android permission.

The 'Correlation.html' file 460 may include information associated with a call relationship between modules or files of the file package.

The 'AppliedSecurityTool.html' file 470 may include list information associated with a security tool applied to the file package. The 'AppliedSecurityTool.html' file 470 may further include information associated with a type or a version of each applied security tool.

The 'dll, so file information' 480 may include information associated with a specific item included in each file. For example, information associated with an Import Address Table (IAT), an Export Address Table (EAT), a section header, a program header, a symbol, etc., of a so file may be included in the 'dll, so file information' 480.

FIG. 5 illustrates an example of analysis information of a vulnerability perspective according to at least one example embodiment.

Referring to a table 500 of FIG. 5, 'type' indicates that a corresponding item is analysis information of a vulnerability perspective. Further, 'name' denotes an identifier indicating a corresponding vulnerability. Further, 'dangerous grade' denotes a dangerous grade of a detected vulnerability. Further, to indicate a file from which the corresponding vulnerability is detected among files included in a file package, 'detected log' indicates information (e.g., an identifier of an open source from which the corresponding vulnerability is detected) associated with an identifier (a file name including a path) of the corresponding file and the vulnerability.

FIG. 6 illustrates an example of a class and a method included in a parsed dll file according to at least one example embodiment, and FIG. 7 illustrates an example of analysis information of an obfuscation perspective based on a class and a method that are identified from a parsed dll file according to at least one example embodiment.

A rectangular box 600 of FIG. 6 may represent identification information of each of classes and methods extracted from a so file included in a file package. For example, the obfuscation detection module 341 of FIG. 3 may verify an obfuscated class and an obfuscated method by analyzing the extracted classes and methods of FIG. 6.

Here, the security evaluation system 300 may generate analysis information of an obfuscation perspective as shown in a table 700 of FIG. 7.

Referring to the table 700 of FIG. 7, 'name' denotes an identifier of a corresponding dll file, 'dangerous grade' denotes a dangerous grade of an obfuscation grade of the corresponding dll file, and 'detected log' denotes information associated with an obfuscation.

In the table 700, 'MethodCrypted' may indicate whether the obfuscation is applied to a method. Here, 'yes' may be a value indicating that the obfuscation is applied to the method.

In the table 700, 'TotalClassNum=23' may indicate that a number of classes extracted from the corresponding dll file is 23 and 'TotalMethodNum=23' may indicate that a number of methods extracted from the corresponding dll file is 23.

In the table 700, 'TotalObfuscatedClassNum=2' may indicate that the obfuscation is applied to two classes among 23 classes included in the corresponding dll file. Further, 'TotalObfuscatedMethodNum=7' may indicate that the obfuscation is applied to 7 classes among 23 methods included in the corresponding dll file.

Here, the security evaluation system 300 or the obfuscation detection module 341 may determine the dangerous grade of the obfuscation perspective of the corresponding dll file based on the number of obfuscation classes and/or the number of obfuscated methods. For example, the dangerous grade of the obfuscation perspective may be determined based on a ratio of the number of obfuscated classes/methods to the total number of classes/methods. In some example embodiments, the dangerous grade of the obfuscation perspective may relatively decrease according to an increase in the ratio.

FIG. 8 illustrates an example of analysis information of an obfuscation perspective with respect to a parsed so file according to at least one example embodiment, and FIG. 9 illustrates another example of analysis information of an obfuscation perspective with respect to a parsed so file according to at least one example embodiment.

A table 800 of FIG. 8 shows that a dangerous grade of an obfuscation perspective for a 'libopenal.so' file is a SAFE grade, and a table 900 of FIG. 9 shows that a dangerous grade of an obfuscation perspective for a 'libnmscrash64-v1.so' file is a CRITICAL grade.

To this end, the security evaluation system 300 or the obfuscation detection module 341 may determine whether an obfuscation is applied to items included in each of so files and may determine the dangerous grade of the obfuscation perspective based on an obfuscation application level. For example, referring to FIGS. 8 and 9, items included in each of the so files include a section header (sectionHeader), a string (strings), a string table (stringTable), a symbol table (symbolTable), and a code. Here, 'yes' may be a value indicating that the obfuscation is applied and 'no' may be a value indicating that the obfuscation is not applied.

FIG. 8 illustrates an example in which the dangerous grade of the obfuscation perspective for the 'libopenal.so' file is determined to be low because the obfuscation is applied to the section header ('sectionHeader=yes') of the 'libopenal.so' file and the symbol table ('symbolTable=yes') and the code of the 'libopenal.so' file ('codepacking=yes'). If 'codepacking=yes', it is difficult to easily acquire an original code of a packed code. Accordingly, whether the code is packed may be used to determine whether the obfuscation is applied.

FIG. 9 illustrates an example in which the dangerous grade of the obfuscation perspective for the 'libnmscrash64-v1.so' file is determined to be high because the obfuscation is not applied to any of the items set or preset in association with the 'libnmscrash64-v1.so' file.

As described above, the security evaluation system 300 may verify whether the obfuscation is applied with respect to different types of items (e.g., items of a class or a method in a dll file, items of a section header, a string, a string table, a symbol table, and/or a code in a so file) based on a type of a file, may automatically determine the dangerous grade of the obfuscation perspective for each of corresponding files based on whether the obfuscation is applied, and may generate analysis information.

The security evaluation system 300 may pre-generate and manage pattern-information-by-perspective with respect to each of an obfuscation perspective, and a vulnerability perspective, and/or a security solution perspective, and may generate analysis information of the obfuscation perspective, analysis information of the vulnerability perspective, and/or analysis information of the security solution perspective based on the pattern-information-by-perspective. The generated analysis information may be provided to a person concerned. Further, additional pattern-information-by-perspective may be further input through the person concerned. For example, a new vulnerability of an existing open source or new pattern information for analyzing the obfuscation and the vulnerability, etc., may be developed based on the provided analysis information. To this end, the security evaluation system 300 may update pre-stored pattern-information-by-perspective by adding the input pattern-information-by-perspective to the pre-stored pattern-information-by-perspective. Here, registered file package may be additionally analyzed to perform an additional analysis based on the new pattern information.

Figure 10:
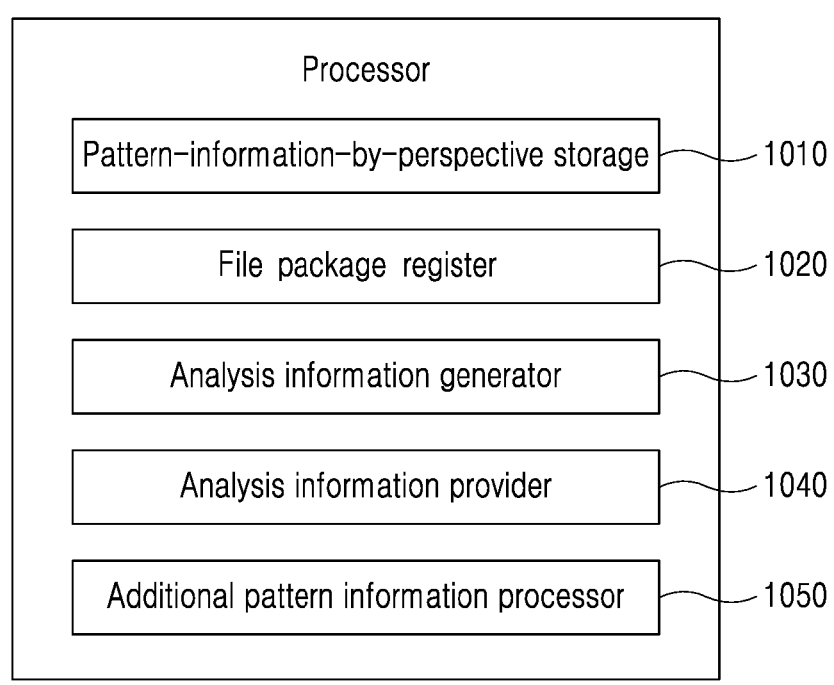
FIG. 10 is a block diagram illustrating a first example of a component includable in a processor of a server according to at least one example embodiment.
Figure 11:
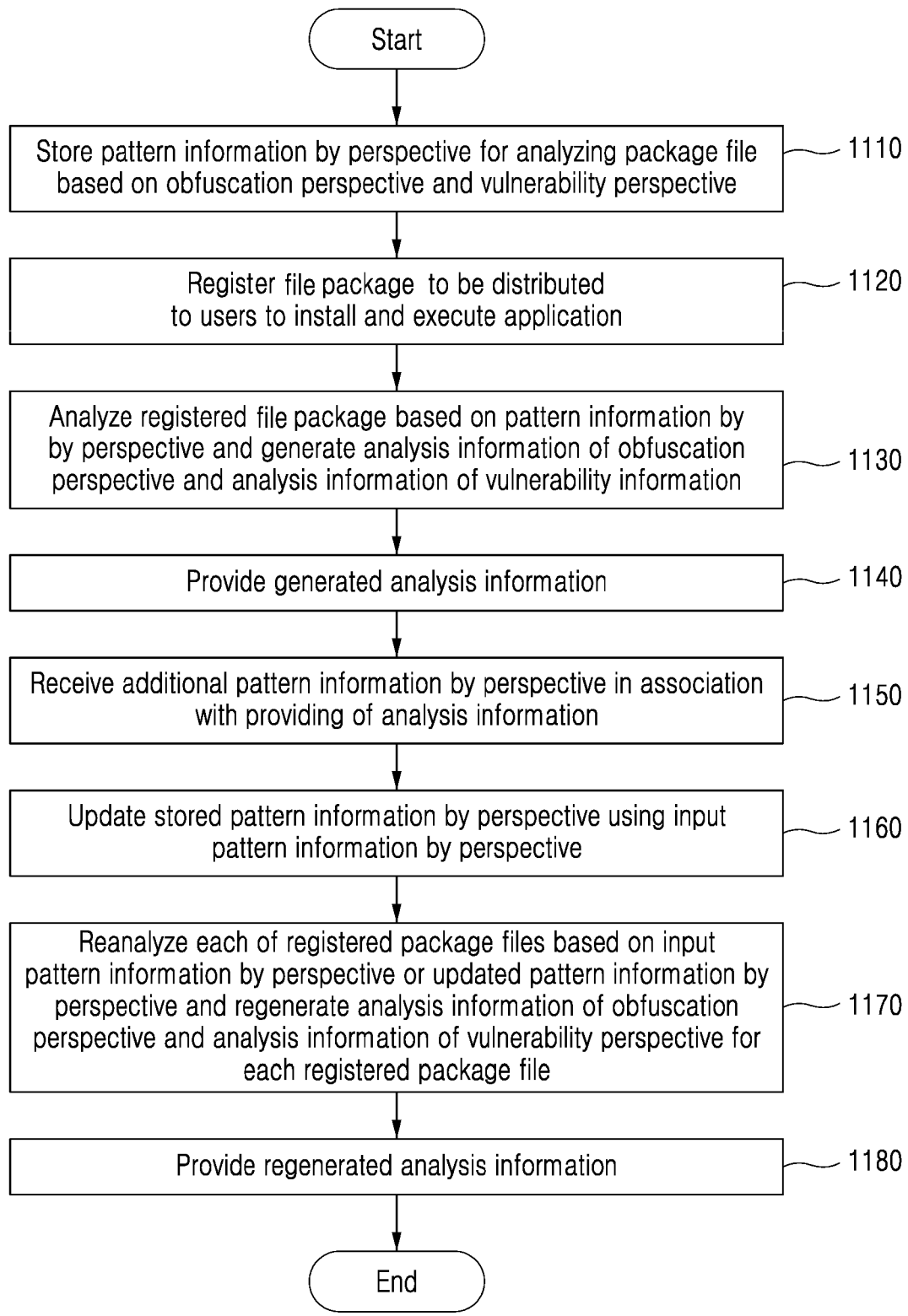
FIG. 11 is a flowchart illustrating a first example of a security evaluation method performed by a server according to at least one example embodiment.

FIG. 10 is a block diagram illustrating a first example of components includable in a processor of a server according to at least one example embodiment, and FIG. 11 is a flowchart illustrating a first example of a security evaluation method performed by a server according to at least one example embodiment.

A security evaluation system according to the example embodiments may be configured as the same computer device as the server 150. Referring to FIG. 10, the processor 222 of the server 150 may include a pattern-information-by-perspective storage 1010, a file package register 1020, an analysis information generator 1030, an analysis information provider 1040, and an additional pattern information processor 1050 as components for configuring the security evaluation system. The processor 222 and the components of the processor 222 may perform operations 1110 through 1180 included in the security evaluation method of FIG. 11. Here, the processor 222 and the components of the processor 222 may be configured to execute control instructions according to a code of at least one program or a code of an OS included in the memory 221. Here, the components of the processor 222 may be representations of different functions of the processor 222 that are performed by the processor 222 in response to the control instructions provided from the code stored in the server 150. For example, the pattern-information-by-perspective storage 1010 may be used as a functional representation of the processor 222 that stores pattern-information-by-perspective in response to the control instructions.

Referring to FIG. 11, in operation 1110, the pattern-information-by-perspective storage 1010 may store pattern-information-by-perspective for analyzing a file package based on an obfuscation perspective and a vulnerability perspective. Pattern information may include information associated with an analysis scheme that is applied to a registered file package for each perspective, for each type of a file and/or each type of a platform.

In operation 1120, the file package register 1020 may registering the file package to be distributed to users to install and execute an application. For example, the file package register 1020 may receive a registration on a file package transmitted from a terminal of a developer to the server 150 over the network 170 or a file package input to the server 150 through a separate recording medium. The registered file package may be distributed to users who desire to use the corresponding application. Here, a security evaluation may be performed prior to the distribution in order to provide security with a certain level or more.

In operation 1130, the analysis information generator 1030 may analyze the registered file package based on the pattern-information-by-perspective to generate analysis information of the obfuscation perspective and analysis information of the vulnerability perspective.

For example, the analysis information generator 1030 may identify files included in the file package by decomposing the registered file package. Further, the analysis information generator 1030 may identify a file to be analyzed for each perspective based on an extension of the identified files, and may generate analysis information of a corresponding perspective for each file that is identified for each perspective.

In some example embodiments, in the pattern-information-by-perspective, pattern information of the obfuscation perspective may include pattern information for identifying whether the obfuscation is applied with respect to each item, from a file that is identified among files included in the registered file package based on the obfuscation perspective.

According to an example embodiment, whether the obfuscation is applied with respect to each item may include whether the obfuscation is applied to each of a method and a class included in the file that is identified based on the obfuscation perspective. In this case, in operation 1130, the analysis information generator 1030 may identify an obfuscated method and an obfuscated class from the file that is identified based on the obfuscation perspective based on the pattern information of the obfuscation perspective, and may generate for each target file analysis information of the obfuscation perspective including (1) a number of methods to which the obfuscation is applied (e.g., a number of obfuscated methods), (2) a number of classes to which the obfuscation is applied (e.g., a number of obfuscated classes), and (3) a dangerous grade that is determined based on the number of obfuscated methods and the number of obfuscated classes. Generation of such analysis information is described above with reference to FIGS. 6 and 7.

According to another example embodiment, whether the obfuscation is applied with respect to each item may include whether the obfuscation is applied to each piece of information corresponding to at least one item of a section header, a string, a string table, a symbol table, and a code that is included in the file identified based on the obfuscation perspective. In this case, in operation 1130, the analysis information generator 1030 may identify items to which the obfuscation is applied from the file that is identified based on the obfuscation perspective based on the pattern information of the obfuscation perspective, and may generate for each target file analysis information of the obfuscation perspective including (1) a type of an item to which the obfuscation is applied and (2) a dangerous grade that is determined based on the type of the item to which the obfuscation perspective is applied.

Further, in the pattern-information-by-perspective, pattern information of the vulnerability perspective may include vulnerability information associated with at least one of a library, an application programming interface (API), and a protocol known in which a vulnerability is present. In this case, in operation 1130, the analysis information generator 1030 may identify a file including the protocol, the library, or the API corresponding to the vulnerability information from among files included in the registered file package based on the pattern information of the vulnerability perspective, and may generate analysis information of the vulnerability perspective including (1) an identifier of the identified file and (2) a dangerous grade that is determined based on a type of the vulnerability included in the identified file.

As described above, analysis information of a security solution perspective may be further generated. For example, in operation 1110, the pattern-information-by-perspective storage 1010 may further store pattern-information-by-perspective for analyzing the file package based on the security solution perspective. In this case, in operation 1130, the analysis information generator 1030 may further analyze the registered file package based on the pattern-information-by-perspective corresponding to the security solution perspective and may further generate analysis information of the security solution perspective.

In operation 1140, the analysis information provider 1040 may provide the generated analysis information. As described above, the generated analysis information may be provided to a person concerned (e.g., an administrator of the server 150 or a security inspection team of an application publisher). Analysis information associated with a reference relationship between the files included in the file package may be further generated. In this case, the analysis information provider 1040 may further provide analysis information associated with the reference relationship. The analysis and provided information is described above.

In operation 1150, the additional pattern information processor 1050 may receive additional pattern-information-by-perspective in association with providing of the analysis information. For example, the additional pattern information processor 1050 may receive the additional pattern-information-by-perspective from the person concerned to which the analysis information is provided. In some example embodiments, pattern information for detecting a new vulnerability may be input from the person concerned in response to discovering a new vulnerability on an open source. Alternatively, if a new file format is developed and commercialized, new pattern-information-by-perspective for analyzing a file package corresponding to the new file format may be input.

In operation 1160, the additional pattern information processor 1050 may update the stored pattern-information-by-perspective using the input pattern-information-by-perspective. Here, the additional pattern information processor 1050 may simply add the input pattern-information-by-perspective to the stored pattern-information-by-perspective, thereby replacing the stored pattern-information-by-perspective with the input pattern-information-by-perspective.

In operation 1170, the analysis information generator 1030 may reanalyze each of the registered file package based on the input pattern-information-by-perspective or the updated pattern-information-by-perspective, and may regenerate analysis information of the obfuscation perspective and analysis information of the vulnerability perspective for each registered file package.

In operation 1180, the analysis information provider 1040 may provide the regenerated analysis information.

In some example embodiments, the security evaluation system may provide a function for exceptionally processing the vulnerability. For example, in the case of detecting a presence of the vulnerability based on pattern information of the vulnerability perspective by the security evaluation system, an accurate vulnerability detection may not be performed on files in terms of a program. For example, a normal file may be detected based on pattern information of a specific vulnerability perspective, and the pattern information may not be modified in a programmed manner. In this case, the security evaluation system may provide an exceptionally processing function of excluding even pattern information of a vulnerability perspective regarding a known vulnerability from the vulnerability detection.

In some example embodiments, the security evaluation system may provide an index management function with respect to an analysis result of each of the obfuscation and the vulnerability. For example, the security evaluation system may record a number of times that a specific vulnerability is detected based on a time and may provide statistical information such as information regarding whether the number of times increases or decreases. As another example, the security evaluation system may provide an index, such as obfuscation technology that is increasingly applied to a file package or obfuscation technology that is decreasingly applied to the file package.

Figure 12:
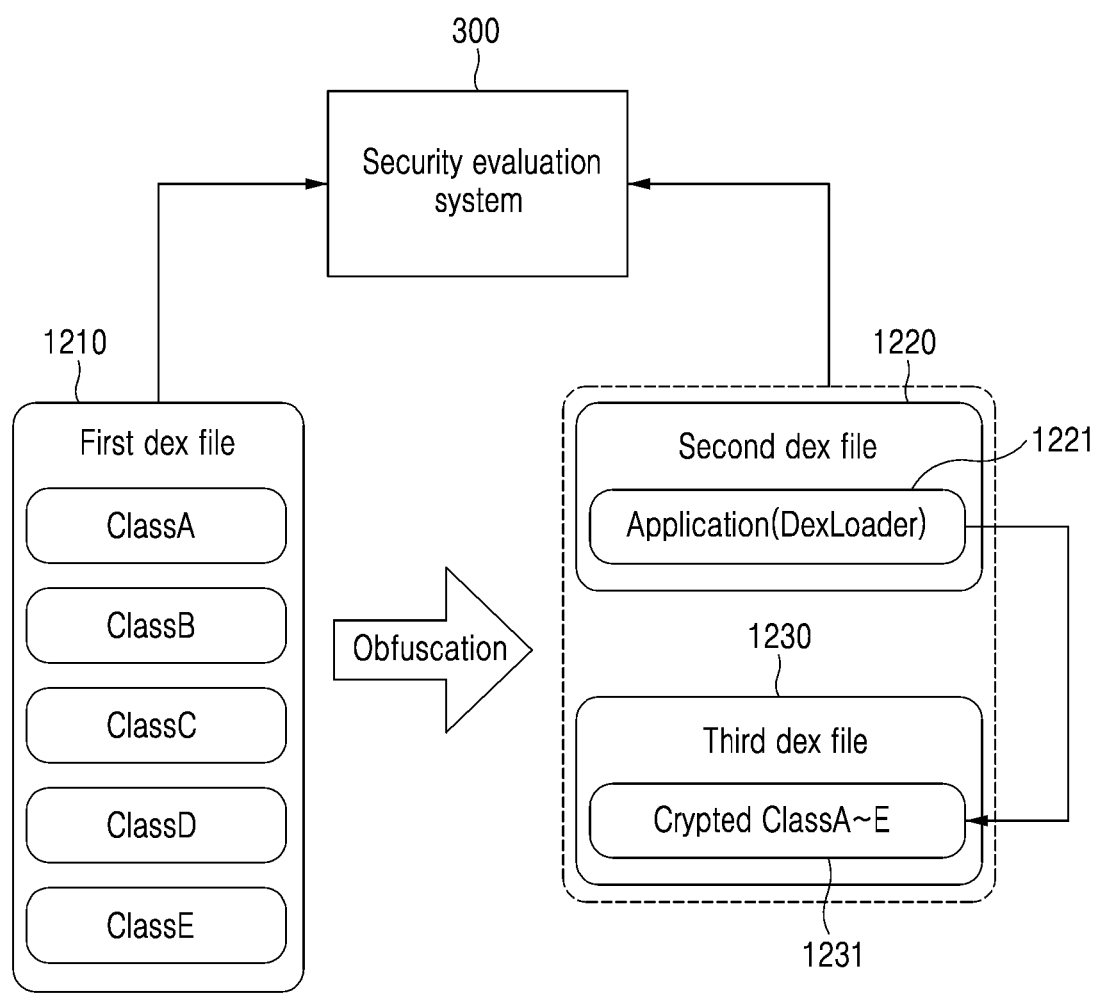
FIG. 12 illustrates an example of determining whether an obfuscation is applied to a dex file according to at least one example embodiment.

FIG. 12 illustrates an example of determining whether an obfuscation is applied to a dex file according to at least one example embodiment. An APK registered to the security evaluation system 300 may include a dex file in which an obfuscation is not applied or in which the obfuscation is applied. Here, the security evaluation system 300 may determine whether the obfuscation is applied to a dex file included in a registered APK.

Referring to FIG. 12, a first dex file 1210 may represent a file in which the obfuscation is not applied and a second dex file 1220 and a third dex file 1230 may represent files in which the obfuscation is applied. That is, the first dex file 1210 may be obfuscated to two dex files (multi dex), for example, the second dex file 1220 and the third dex file 1230. Here, the second dex file 1220 may be a file in which classes (five classes including ClassA, ClassB, ClassC, ClassD, and ClassE (hereinafter, ClassA~E)) are removed from the first dex file 1210, and the removed classes may be encrypted. The third dex file 1230 that is a new dex file in which encrypted CassA to ClassE (Crypted ClassA~E) 1231 are included may be included in the APK.

In the example embodiment of FIG. 12, classes (ClassA~E) to be included in a dex file may be encrypted and thereby stored in the third dex file 1230. Thus, the second dex file 1220 needs to include a function for loading the third dex file 1230 to a memory. That is, the function for loading a dex file needs to be included in an application class (Application) 1221 included in the second dex file 1220. The APK provides an API for loading a dex file and accordingly, the application class 1221 included in the second dex file 1220 may include a function (DexLoader) for an API call. For example, a class loader ('ClassLoader' or 'DexClassLoader') class and a load class ('LoadClass') method included in the ClassLoader class need to be called for loading the dex file (the third dex file 1230 of FIG. 12) through the application class 1221.

To determine whether the obfuscation is applied to a single dex file (e.g. the second dex file 1220 of FIG. 12) in this perspective, the security evaluation system 300 may verify whether an API call for loading the dex file (e.g., the third dex file 1230 of FIG. 12) through the application class 1221 included in an application class (e.g., the second dex file 1220 of FIG. 12) included in the corresponding dex file is performed.

In some example embodiments, in the APK, whether the obfuscation is applied to the corresponding dex file may be determined based on whether the ClassLoader class and the LoadClass method included in the ClassLoader class are applied are called in the above example. That is, the security evaluation system 300 may verify whether the ClassLoader class and the LoadClass method are called from the dex file to be determined regarding to which the obfuscation is applied.

Because the first dex file 1210 includes all of the classes (e.g., ClassA~E), the API call for loading a separate dex file may not be performed. Thus, the security evaluation system 300 may verify that the obfuscation is not applied to the first dex file 1210. Meanwhile, in some example embodiments, the second dex file 1220 may acquire the Crypted ClassA~E 1231 only when the third dex file 1230 is loaded. Thus, the API call for loading the third dex file 1230 may be performed. The security evaluation system 300 may verify that the obfuscation is applied to the second dex file 1220 by detecting the API call.

Figure 13:
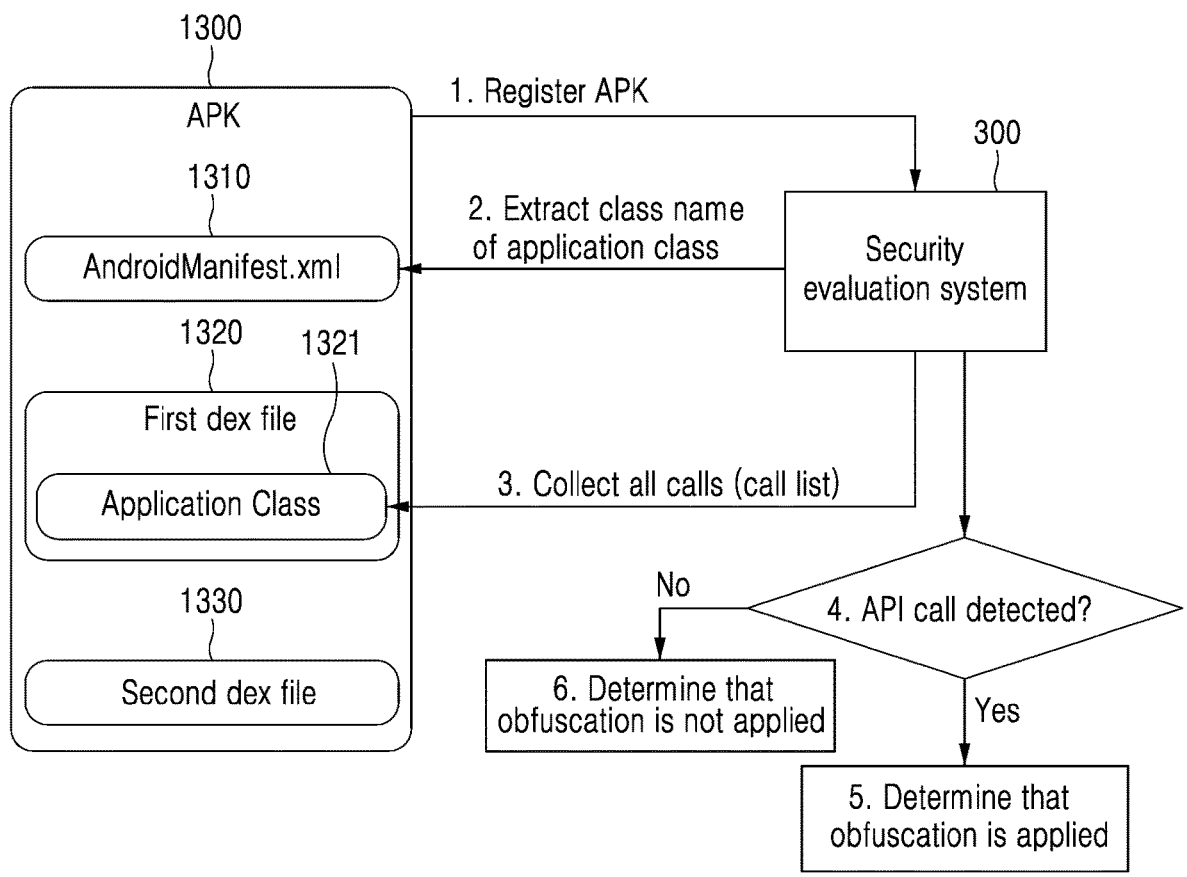
FIG. 13 illustrates an example of a process of detecting an API call according to at least one example embodiment.

FIG. 13 illustrates an example of a process of detecting an API call according to at least one example embodiment.

In process 1, the security evaluation system 300 may register an APK 1300. The APK 1300 may be registered to an application publisher in order to be distributed to users of an application. As described above, the security evaluation system 300 may be configured in an apparatus (e.g., the server 150) that provides a service so that the application publisher may distribute a file package of applications registered to the application publisher or may be configured as a separate system that communicates with the aforementioned apparatus over the network 170. For example, the security evaluation system 300 may receive and register the APK 1300 registered to the server 150 over the APK 1300.

In process 2, the security evaluation system 300 may extract a class name of an application class 1321 from an android manifest file 1310. Although the android manifest file 1310 such as 'AndroidManifest.xml' is included in the APK 1300, it is already well known that the android manifest file 1310 includes the class name of the application class 1321.

In process 3, the security evaluation system 300 may collect all of calls from the application class 1321 that is identified based on the extracted class name. For example, the security evaluation system 300 may identify the application class 1321 included in the first dex file 1320 based on the extracted class name, and may generate a call list about a class and a method that are called in a body instruction of each of all of methods included in the identified application class 1321. For example, the security evaluation system 300 may generate the call list based on a call relationship that is generated by the parsing module 330 of FIG. 3.

In process 4, the security evaluation system 300 may detect an API call for loading another dex file (e.g., the second dex file 1330 of FIG. 13). To this end, the security evaluation system 300 may verify whether a class loader ('ClassLoader' or 'DexClassLoader') class and a load class ('LoadClass') method are called through the call list. That is, call of the ClassLoader class and the LoadClass method may be detected as the API call for loading another dex file.

If the API call is detected, the security evaluation system 300 may determine that an obfuscation is applied to the first dex file 1320 in process 5. If the API call is not detected, the security evaluation system 300 may determine that the obfuscation is not applied to the first dex file 1320 in process 6.

Here, depending on implementation of the application class, the API call may not be performed in a body instruction of a method included in the application class and the API call for loading the dex file may be performed in a body instruction of another method called through the corresponding method. To detect the API call associated with the above event, the security evaluation system 300 may verify whether the API call is performed on all of methods directly/indirectly called through a method included in the application class using a scheme of detecting the API call through another call list collected in a body instruction of a method identified through the call list. Here, if the API call is not performed on all of the methods directly/indirectly called through the method included in the application class, the security evaluation system 300 may determine that the obfuscation is not applied to the first dex file 1320.

Because a class name of a related application class is not extracted from the android manifest file 1310, whether the obfuscation is applied to the second dex file 1330 may not be separately determined.

Further, an obfuscation scheme of encrypting all of body instructions of methods may be used in addition to the aforementioned obfuscation scheme using the multi dex.

Figure 14:
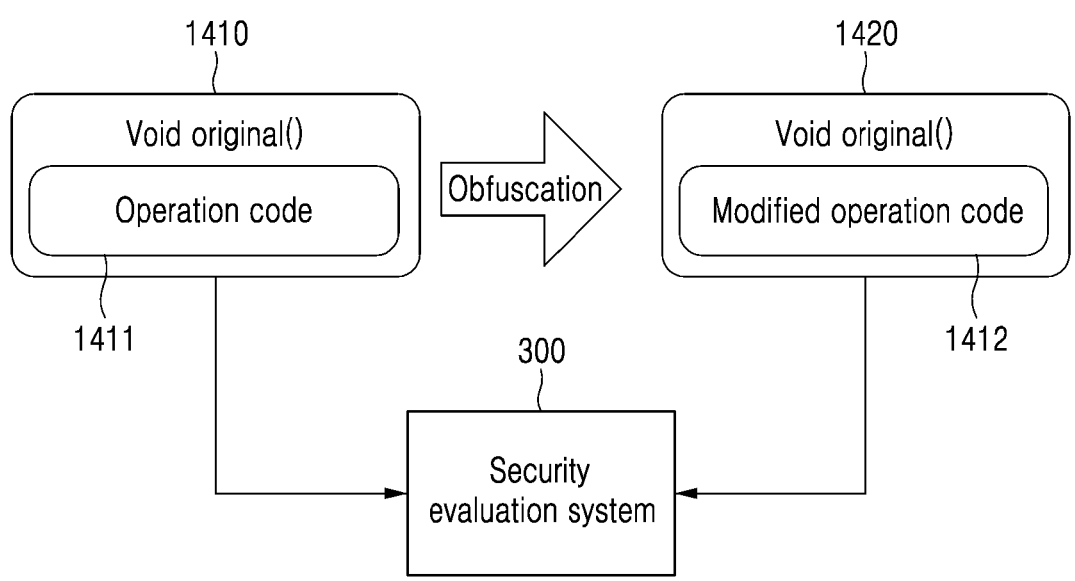
FIG. 14 illustrates an example of detecting an obfuscation using encryption of a body instruction according to at least one example embodiment.

FIG. 14 illustrates an example of detecting an obfuscation using encryption of a body instruction according to at least one example embodiment. FIG. 14 illustrates an example of generating a method 1420 that includes a modified operation code 1412 by encrypting or decrypting an operation code 1411 of a specific method 1410 included in a dex file or by obfuscating the dex file through insertion of a dummy code.

Here, considering that the dex file is generated through a compile, the modified operation code 1412 may desired to be replaced with a compile code instead of being replaced with a random code, and thus the modified operation code 1412 may have a few patterns. For example, the modified operation code 1412 includes a pattern (e.g., a continuation or branch of an LDR instruction in an ARM assembly instruction, or a continuation of an LSLS instruction) of an instruction that does affect a register or has no meaning.

Also, in the case of a normal byte code, codes may be defined or predefined based on a continuation of a certain hexa value. For example, the website http://pallergabor.uw.hu/androidblog/dalvik_opcodes.html describes a dalvik OP code.

Each of methods may verify a number of local variable registers used through a directive 'local'. If 'local'=2, it may indicate that two local variable registers (e.g., v0 and v1) are used. Here, if a hexa value '0B' is found, a following hex value may indicate a local variable register. For example, as described at the above website, the hex value '0B' corresponds to an OP code name 'move-result-object vx', and the OP code may be an instruction that instructs to move a long/double result value of previous method invocation to 'vx' and 'vx+1'. That is, '0B02' moves a long/double result value of previous directive invocation to two local variable registers, 'v2' and 'v3'. In this case, the security evaluation system 300 may verify whether required local variable registers are available based on the number of local variable registers that are verified through 'local' and local variable registers that are required through '0B02'. As another example, a hex value '6E' needs to specify a local variable register corresponding to a parameter of a current instance and local variable registers corresponding to method parameters after OP code 'invoke-virtual' as described at the above website. Even in this case, the security evaluation system 300 may verify whether the registers are available registers using 'local' and may determine whether the operation code of the method 1410 is a general (or normal) code or an obfuscated (or modified) code through the aforementioned method.

Accordingly, the security evaluation system 300 may store or prestore and manage a normalized pattern, and may determine whether the obfuscation is applied to the dex file by detecting a method of an operation code that processes an instruction of a corresponding pattern. That is, in the example embodiment of FIG. 14, the security evaluation system 300 may retrieve the prestored pattern from the operation code 1411 or the modified operation code 1412, and may determine whether the obfuscation is applied to the corresponding method 1420 through the modified operation code 1412 from which the prestored pattern is found. It may indicate that the obfuscation is applied to the dex file included in the corresponding method 1420.

Here, whether the obfuscation is applied may be determined for each method included in the dex file. Accordingly, depending on example embodiments, the security evaluation system 300 may determine a security grade corresponding to the obfuscation based on a ratio of the obfuscated methods to the methods included in the dex file.

Figure 15:
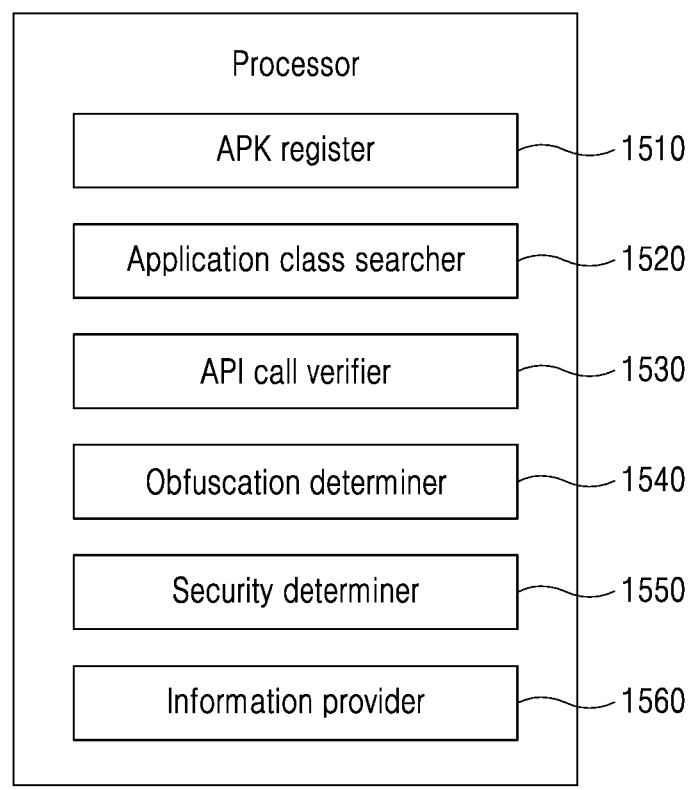
FIG. 15 is a block diagram illustrating a second example of a component includable in a processor of a server according to at least one example embodiment.
Figure 16:
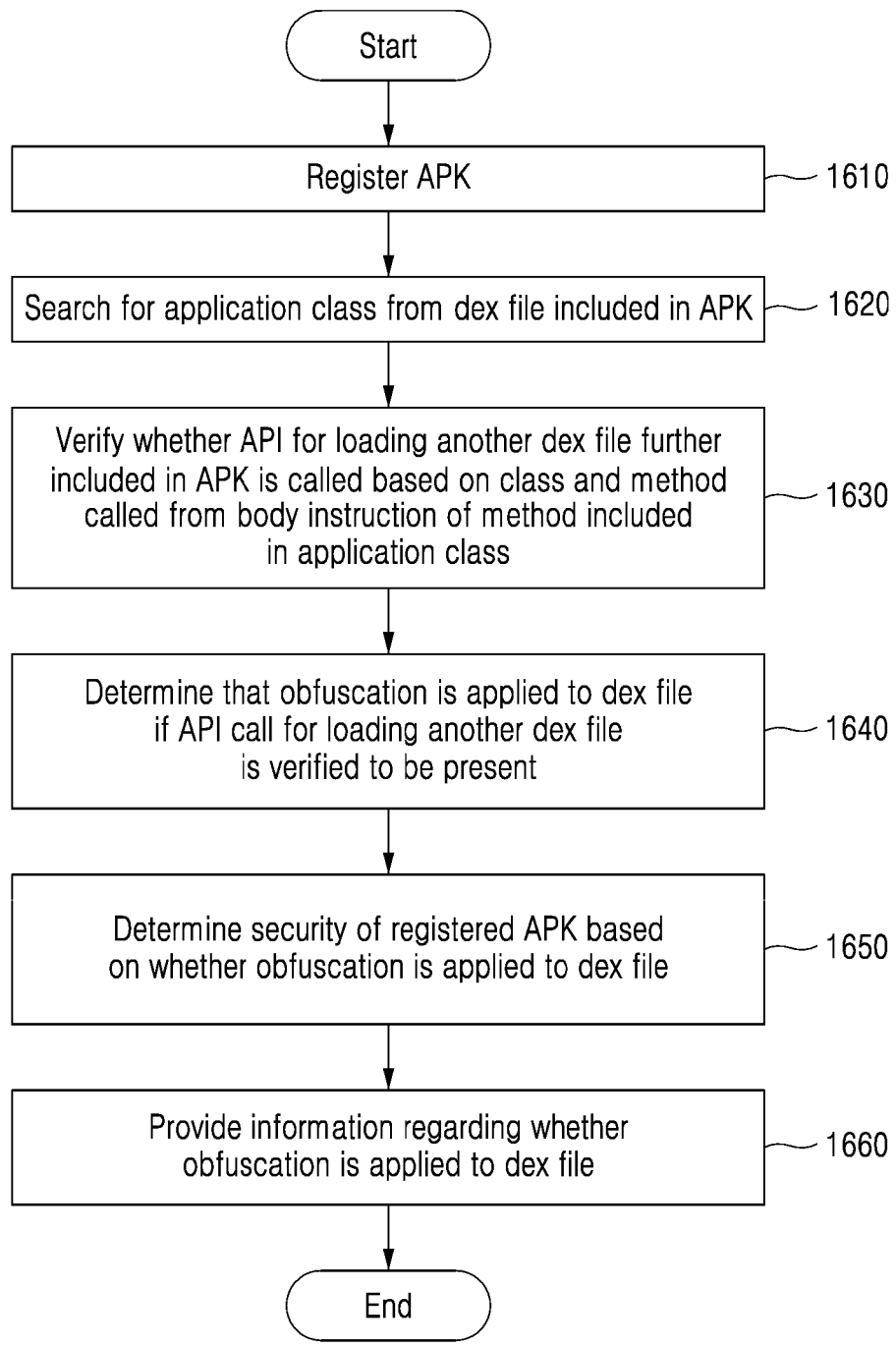
FIG. 16 is a flowchart illustrating a second example of a security evaluation method performed by a server according to at least one example embodiment.

FIG. 15 is a block diagram illustrating a second example of a component includable in a processor of a server according to at least one example embodiment, and FIG. 16 is a flowchart illustrating a second example of a security evaluation method performed by a server according to at least one example embodiment.

The security evaluation system 300 according to the example embodiments may be configured as a computer apparatus such as the server 150. Referring to FIG. 15, the processor 222 of the server 150 may include an APK register 1510, an application class searcher 1520, an API call verifier 1530, an obfuscation determiner 1540, a security determiner 1550, and an information provider 1560 as components that constitute the security evaluation system 300. The processor 222 and the components of the processor 222 may perform operations 1610 through 1660 included in the security evaluation method of FIG. 16. Here, the processor 222 and the components of the processor 222 may be configured to execute a control instruction according to a code of at least one program or a code of an OS included in the memory 221. Here, the components of the processor 222 may be representations of different functions of the processor 222 that are performed by the processor 222 in response to a control instruction provided from the code stored in the server 150. For example, the APK register 1510 may be used as a functional representation of the processor 222 that is controlled by the processor 22 to register an APK in response to the control instruction.

Referring to FIG. 16, in operation 1610, the APK register 1510 may register an APK. The APK may be registered to an application publisher in order to be distributed to users of an application. As described above, the security evaluation system may be configured in an apparatus that provides a service so that the application publisher may distribute a file package of applications registered to the applicator publisher or may be configured as a separate system that communicates with the apparatus over the network 170. For example, the security evaluation system 300 may receive and register an APK registered to the application publisher over the network 170.

In operation 1620, the application class searcher 1520 may search for an application class from a dex file included in the APK. For example, the application class searcher 1520 may extract a class name of the application class from an android manifest file (e.g., 'AndroidManifest.xml'), and may search for an application class corresponding to the class name extracted from the dex file.

In operation 1630, the API call verifier 1530 may verify whether an API for loading another dex file further included in the APK is called based on a class and a method called from a body instruction of a method included in the application class. As described above, the API call verifier 1530 may generate a call list of classes and methods called from the respective body instructions of all of the methods included in the identified application class. Here, the API call verifier 1530 may verify whether a class loader ('ClassLoader' or 'DexClassLoader') class and a load class ('LoadClass') method based on the call list. That is, call of the ClassLoader class and the LoadClass method may be detected as the API call for loading another dex file.

If the ClassLoader class and the LoadClass method are not retrieved from the generated call list, the API call verifier 1530 may further conduct a search regarding whether the ClassLoader class and the LoadClass method are called through the call list collected from the body instruction of the method that is identified through the call list. As described above, an API call verifying process may be performed on a class and a method that are indirectly called from all of the methods included in the application class and may also be iteratively performed on a class and a method that are called again by the called method. In this manner, the API call verifying process may be performed on all of the classes and methods that are indirectly/directly called by a method included in the application class.

If the API call for loading another dex file is verified to be present, the obfuscation determiner 1540 may determine that an obfuscation is applied to the dex file in operation 1640. On the contrary, if the API call for loading another dex file is verified to be absent, the obfuscation determiner 1540 may determine that the obfuscation is not applied to the dex file in operation 1640.

In operation 1650, the security determiner 1550 may determine a security of the registered APK based on whether the obfuscation is applied to the dex file. For example, if the obfuscation is applied to the dex file, the security of the registered APK may be determined to be relatively high compared to a case in which the obfuscation is not applied to the dex file.

In operation 1660, the information provider 1560 may provide information regarding whether the obfuscation is applied to the dex file. For example, information regarding a file name of a specific dex file, whether the obfuscation is applied thereto, etc., may be provided. For example, related information may be provided to the administrator and the like, which is described above with reference to FIG. 3.

Figure 17:
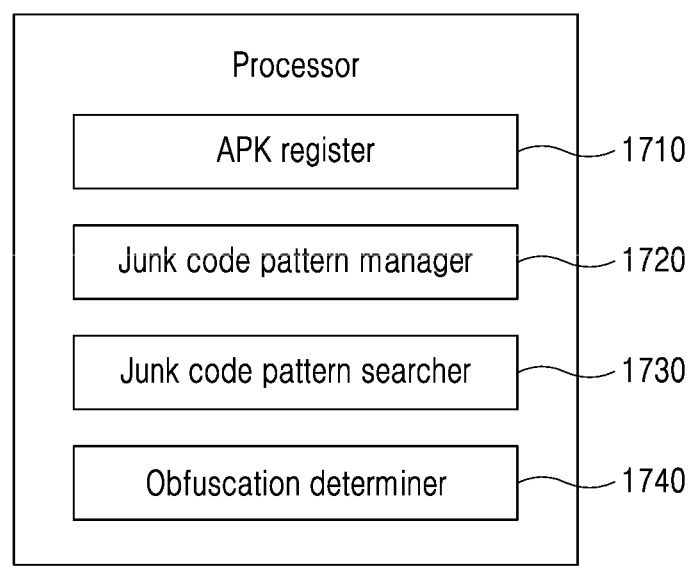
FIG. 17 is a block diagram illustrating a third example of a component includable in a processor of a server according to at least one example embodiment.
Figure 18:
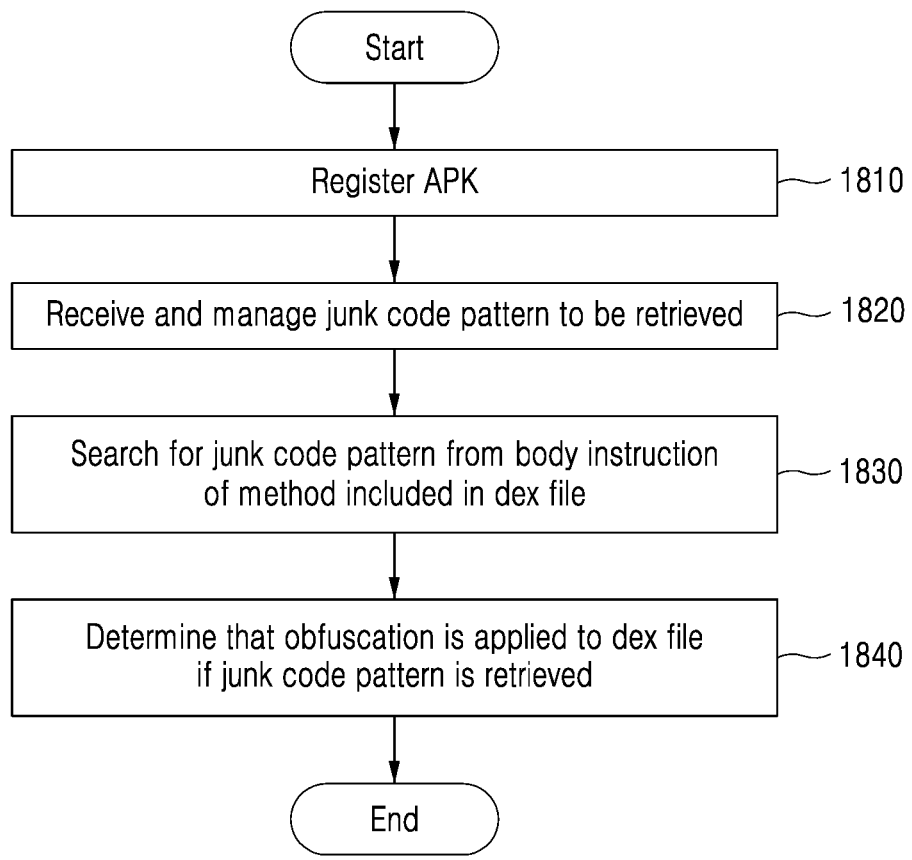
FIG. 18 is a flowchart illustrating a third example of a security evaluation method performed by a server according to at least one example embodiment.

FIG. 17 is a block diagram illustrating a third example of a component includable in a processor of a server according to at least one example embodiment, and FIG. 18 is a flowchart illustrating a third example of a security evaluation method performed by a server according to at least one example embodiment.

The processor 222 of the server 150 according to the example embodiment may include an APK register 1710, a junk code pattern manager 1720, a junk code pattern searcher 1730, and an obfuscation determiner 1740 as components for configuring the security evaluation system 300. The processor 222 and the components of the processor 222 may perform operations 1810 through 1840 included in the security evaluation method of FIG. 18. Here, the processor 222 and the components of the processor 222 may be configured to execute an instruction according to a code of at least one program or a code of an OS included in the memory 221. Here, the components of the processor 222 may be representations of different functions of the processor 222 that are performed by the processor in response to a control instruction provided from the code stored in the server 150.

Referring to FIG. 18, in operation 1810, the APK register 1710 may register an APK. The APK register 1710 may correspond to the APK register 1510 of FIG. 15.

In operation 1820, the junk code pattern manager 1720 may receive and manage a junk code pattern to be retrieved. As described above with reference to FIG. 14, the junk code pattern may set or preset and use patterns that appear based on whether an obfuscation is applied to a body instruction of a method. Here, operation 1820 may be performed before operation 1810.

In operation 1830, the junk code pattern searcher 1730 may search for the junk code pattern from a body instruction of a method included in a dex file. The dex file may be generated through compiling and a code transformed based on whether the obfuscation is applied with respect to the body instruction of the method may not include a random value and may have a predefined pattern. Accordingly, the junk code pattern searcher 1730 may verify whether the junk code pattern is retrieved from the body instruction of the method.

In operation 1840, if the junk code pattern is retrieved, the obfuscation determiner 1740 may determine that the obfuscation is applied to the dex file. Here, security of the registered APK may be determined based on whether the obfuscation is applied to the dex file. Alternatively, whether the obfuscation is applied may be determined for each method. Accordingly, the security of the registered APK may be determined based on a ratio of obfuscated methods to the entire methods. In addition, information associated with a method, that is, an obfuscated method, to which the application is applied may be provided to the administrator and the like.

Depending on example embodiments, the example embodiments of FIGS. 15 and 16 may combine with the example embodiments of FIGS. 17 and 18. For example, detection regarding whether an API call for loading the dex file with respect to the registered APK and detection of the junk code pattern may be performed in parallel. Here, if an API call for loading another dex file is verified to be present or if the junk code pattern is retrieved, the obfuscation determiner 1540 or the obfuscation determiner 1740 may determine that the obfuscation is applied to the dex file. In this case, the security may be determined based on a weighted sum of securities that are determined in parallel and each piece of detected information may be provided to the administer and the like.

Figure 19:
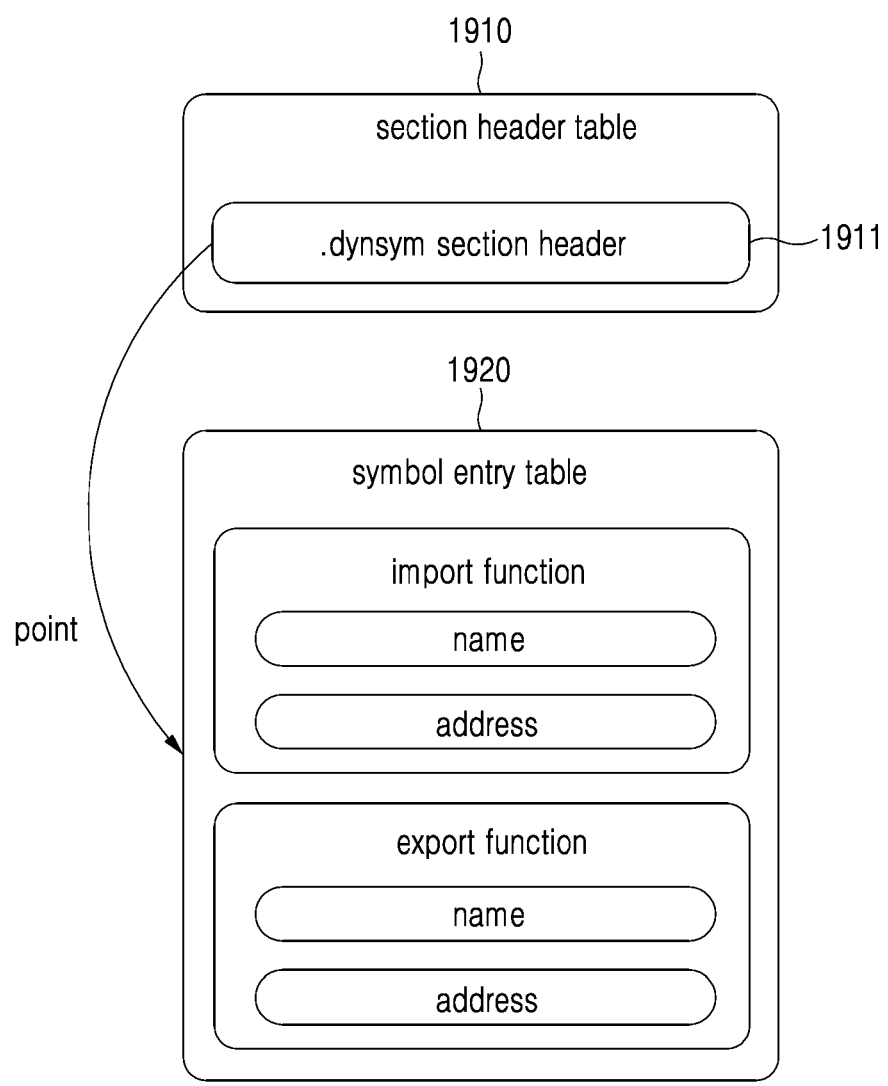
FIGS. 19 and 20 illustrate a first example of detecting an obfuscation for a symbol from an ELF file included in a registered file package according to at least one example embodiment.
Figure 20:
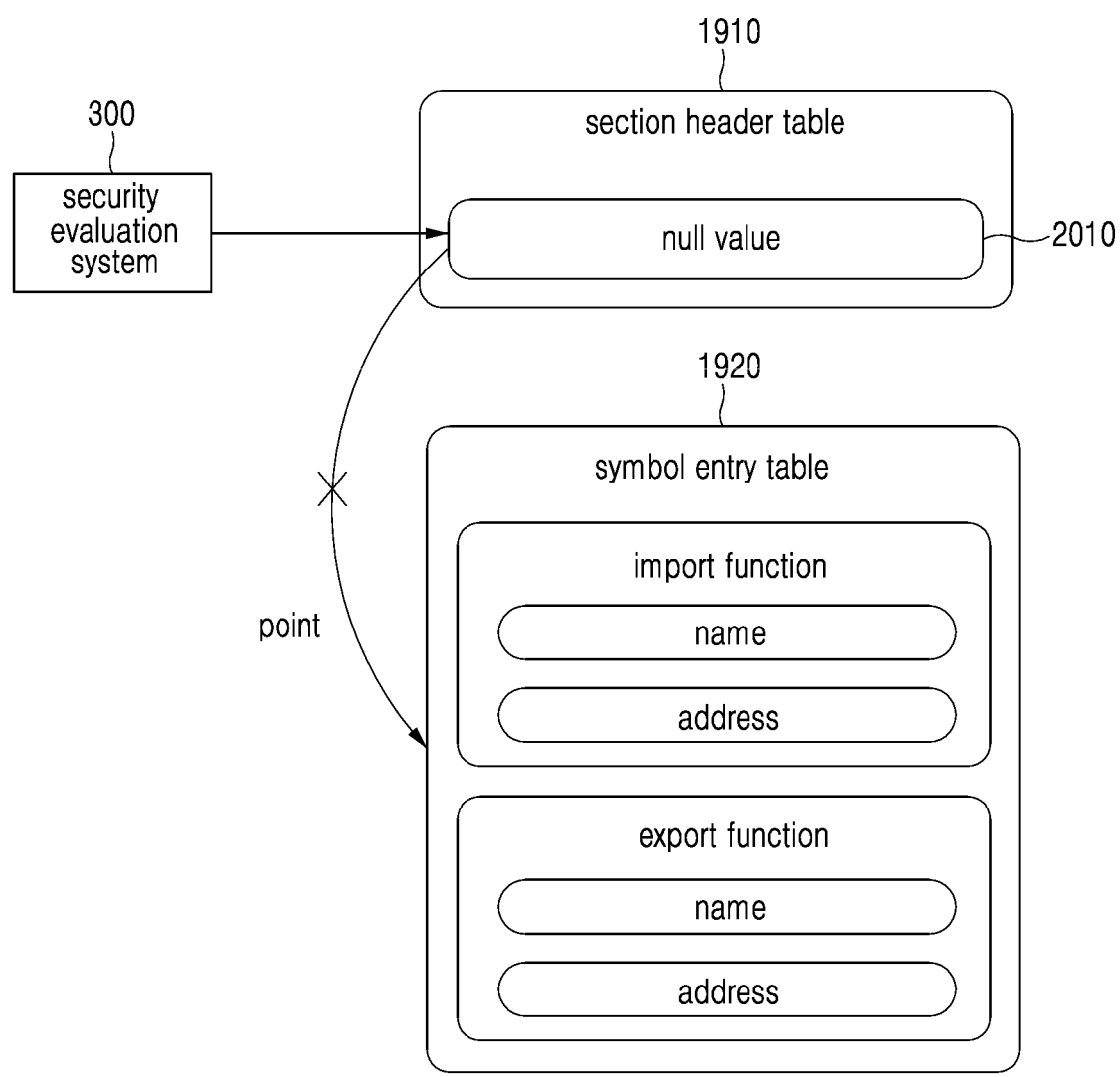

FIGS. 19 and 20 illustrate a first example of detecting an obfuscation for a symbol from an ELF file included in a registered file package according to at least one example embodiment.

FIG. 19 illustrates a section header table 1910 included in an ELF file and a header 1911 (hereinafter, also referred to as the dynsym section header 1911) of a dynamic linking symbol table section (.dynsym section) included in the section header table 1910. Also, FIG. 19 further illustrates a symbol entry table 1920 of the dynamic linking symbol table section (.dynsym section) included in the ELF file. Referring to FIG. 19, the header 1911 of the dynamic linking symbol table section may point the symbol entry table 1920. The symbol entry table 1920 may be a table that lists names and addresses of an import function and an export function.

In the ELF file, the section header table 1910 defines each piece of information (e.g., a name, a memory, a start address, a file offset, a size, an alignment scheme, and/or a representation scheme) of each of sections included in the ELF file. In addition to the aforementioned .dynsym section, the sections include various sections such as a dynamic linking information section (.dynamic section), a read-only data section (.rodata section or .rdata section), a section (.init section or .init_array section) including a code to be used for a process initialization, and the like, which is already well known. For example, information associated with the .dynsym section may be defined through the header of the .dynsym section in the section header table 1910. The header of the .dynsym section may point the .dynsym section through at least a portion (e.g., a start address, a file offset, and a size of the .dynsym section) of the defined values.

FIG. 20 illustrates an example of obfuscating values defined in the header 1911 of the dynamic linking symbol table section of FIG. 19. In this case, the header 1911 of the dynamic linking symbol table section may not point the symbol entry table 1920. Therefore, the section header of the ELF file may be obfuscated.

As described above, symbols used in the ELF file may be obfuscated by obfuscating the values defined in the header 1911 of the dynamic linking symbol table section through, such as changing the values into a null value 2010 or another piece of information. Here, the security evaluation system 300 may detect the obfuscation of the section header by analyzing the values defined in the header 1911 of the dynamic linking symbol table section.

For example, the security evaluation system 300 may determine that the obfuscation is applied to the section header if any one of a first condition that the header 1911 of the dynamic linking symbol table section includes the null value 2010, a second condition that the header 1911 of the dynamic linking symbol table section is incapable of being parsed, and a third condition that information included in the header 1911 of the dynamic linking symbol table section is absent in the dynamic linking information section (.dynamic section) among the sections is met.

As described with reference to FIG. 20, the first condition may indicate a condition that the value defined in the header 1911 of the dynamic linking symbol table section is replaced with the null value 2010.

For example, the header 1911 of the dynamic linking symbol table section may be in a predefined structure. There may be an existing scheme for parsing the header 1911 of the dynamic linking symbol table section based on the predefined structure. Here, the second condition may indicate a condition that an attempt to parse the header 1911 of the dynamic linking symbol table section is made using the existing parsing scheme and the header 1911 of the dynamic linking symbol table section is not normally parsed. That is, if the header 1911 of the dynamic linking symbol table section is obfuscated, the security evaluation system 300 may not parse the header 1911 of the dynamic linking symbol table section. Accordingly, the security evaluation system 300 may verify that the second condition is met.

Further, at least a portion of the values defined in the header 1911 of the dynamic linking symbol table section based on the predefined structure thereof may also be included in a dynamic linking information section (.dynamic section) and a value of the dynamic linking information section (.dynamic section) may not be changed. Accordingly, the security evaluation system 300 may verify whether information included in the header 1911 of the dynamic linking symbol table section is present in the dynamic linking information section (.dynamic section), and if absent, may verify that the value included in the header 1911 of the dynamic linking symbol table section is changed. That is, the security evaluation system 300 may verify that the third condition is met.

Once one of the first condition, the second condition, and the third condition is met, the security evaluation system 300 may determine that the obfuscation is applied to the header 1911 of the dynamic linking symbol table section.

Figure 21:
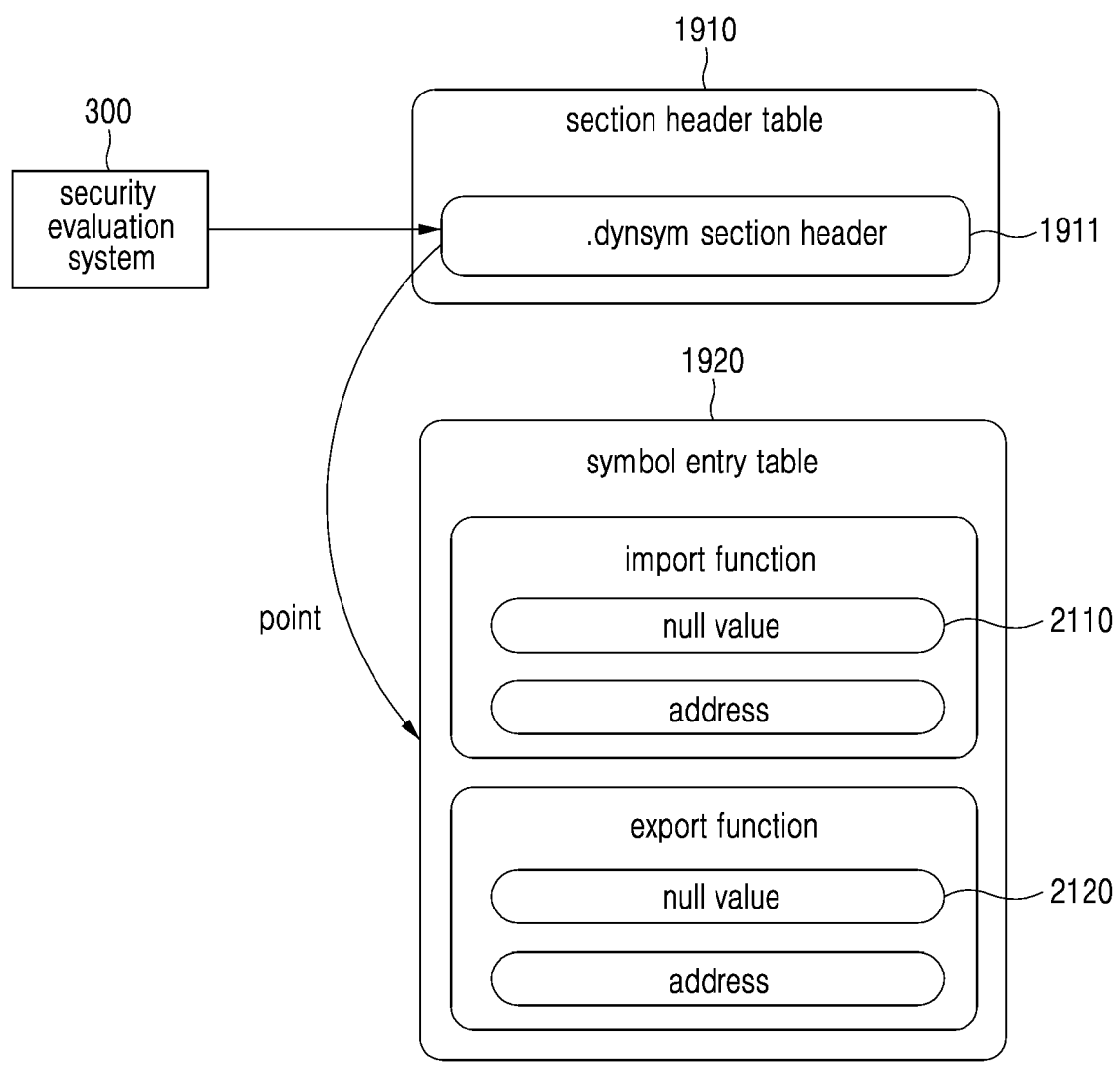
FIG. 21 illustrates a second example of detecting an obfuscation for a symbol from an ELF file included in a registered file package according to at least one example embodiment.

FIG. 21 illustrates a second example of detecting an obfuscation for a symbol from an ELF file included in a registered file package according to at least one example embodiment. FIG. 21 illustrates, as an example of applying an obfuscation to a value of the symbol entry table 1920 not the header 1911 of the dynamic linking symbol table section, an example of changing a name 2110 of an import function and a name 2120 of an export function with a null value.

For the above instance, the security evaluation system 300 may retrieve the symbol entry table 1920 that is pointed by the header 1911 of the dynamic linking symbol table section, may analyze values of the import function and the export function, and may determine whether the obfuscation is applied to the dynamic linking symbol table section. For example, if values of the import function and the export function include a null value or are not represented using an American Standard Code for Information Interchange (ASCII) code, the security evaluation system 300 may determine that the obfuscation is applied to a section, for example, the dynamic linking symbol table section.

Figure 22:
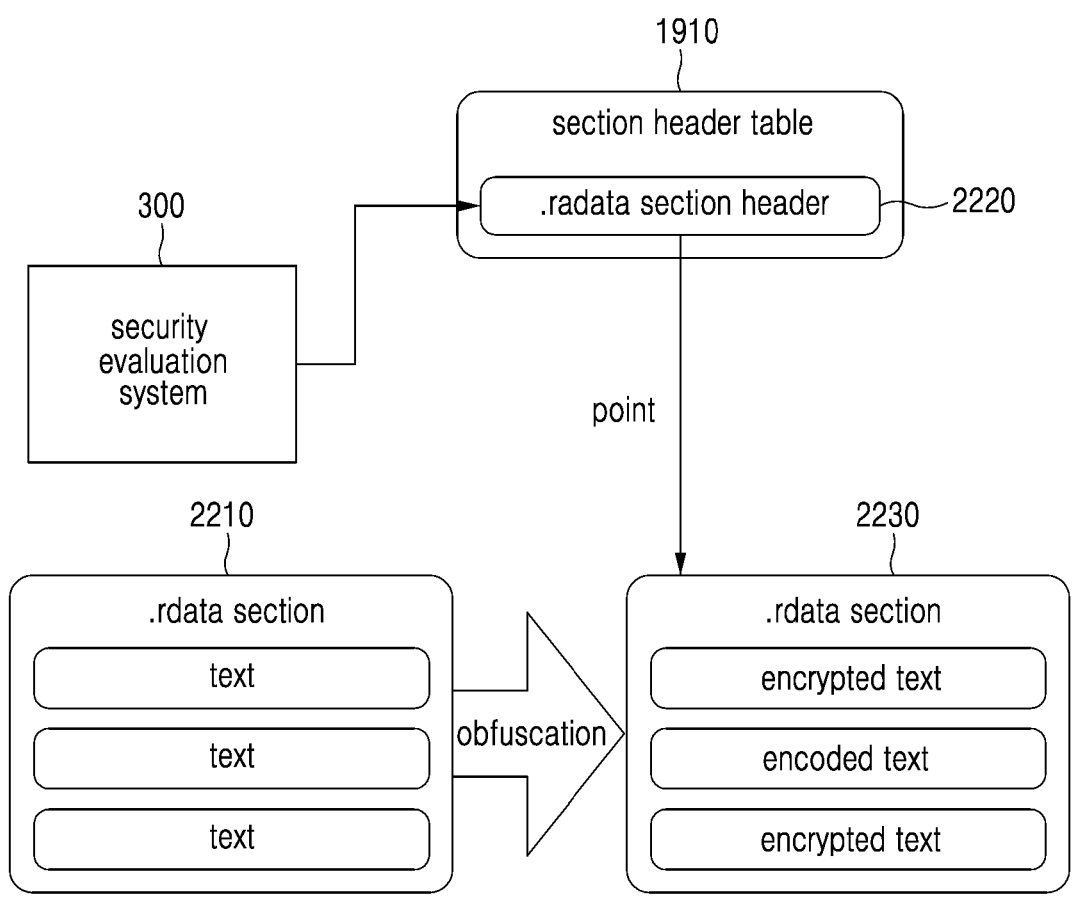
FIG. 22 illustrates a third example of detecting an obfuscation for a symbol from an ELF file included in a registered file package according to at least one example embodiment.

FIG. 22 illustrates a third example of detecting an obfuscation for a symbol from an ELF file included in a registered file package according to at least one example embodiment. The ELF file may include a read-only section (a .rdata section 2210 or a .rodata section). The section header table 1910 may include a header (a .rdata section header 2220 or a .rodata section header) for the read-only section.

An obfuscation for the read-only section may be performed by encrypting or encoding texts included in the read-only section. Accordingly, the security evaluation system 300 may detect the obfuscation for the read-only section by verifying the read-only section through a header for the read-only section and by analyzing read-only values included in the verified read-only section.

For example, referring to FIG. 22, the security evaluation system 300 may identify the .rdata section header 2220 from the section header table 1910 of the ELF file, may retrieve a .rdata section 2230 pointed by the identified .rdata section header 2220, and may analyze values included in the retrieved .rdata section 2230. Here, the .rdata section 2230 may be a section in which texts included in the .rdata section 2210 are obfuscated. If values included in the .rdata section 2230 include a null value or are not represented using an ASCII code, the security evaluation system 300 may verify that the obfuscation is applied to the .rdata section 2230, which is different from the case of the .rdata section 2210.

Figure 23:
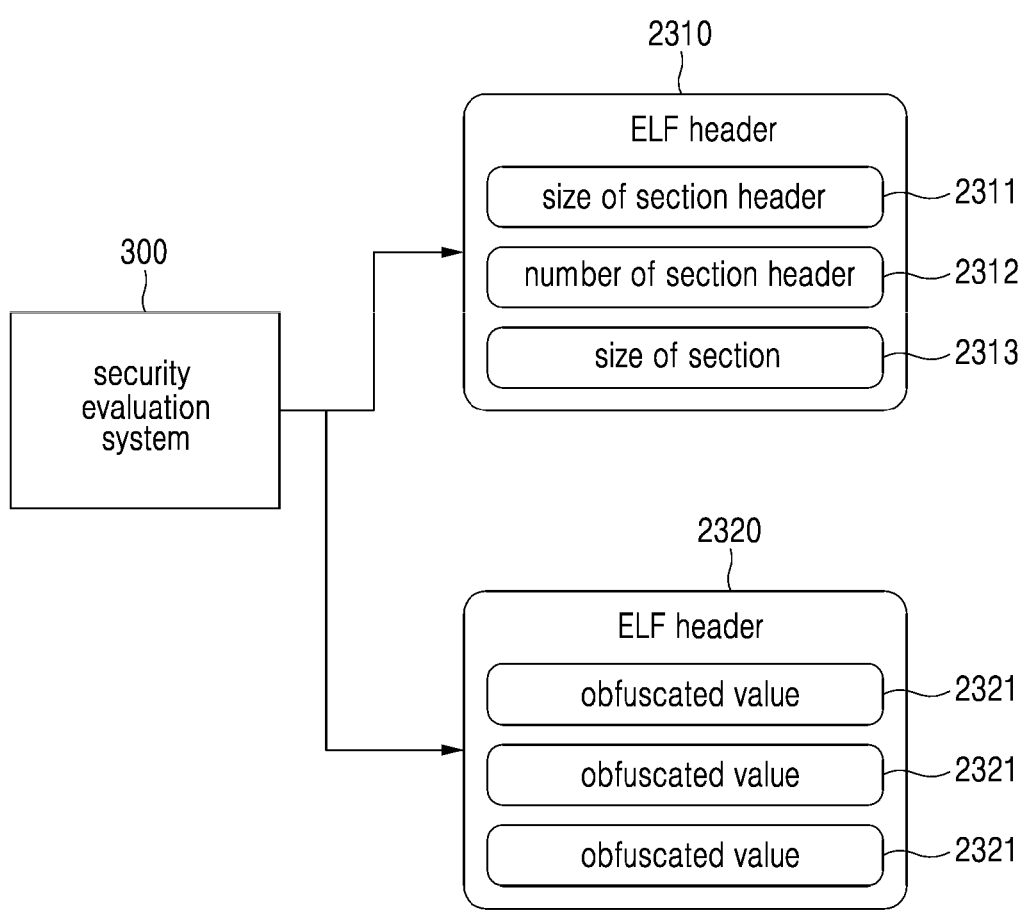
FIG. 23 illustrates an example of detecting an obfuscation for an ELF header of an ELF file according to at least one example embodiment.

FIG. 23 illustrates an example of detecting an obfuscation for an ELF header of an ELF file according to at least one example embodiment. Referring to FIG. 23, a first ELF header 2310 is a header to which an obfuscation is not applied and includes a variety of information such as a size of a section header 2311, a number of section headers 2312, and a size of a section 2313. A second ELF header 2320 is a header to which the obfuscation is applied. Here, original values are changed with obfuscated values 2321.

To detect the obfuscation as above, the security evaluation system 300 may determine whether the obfuscation is applied to the ELF header based on whether an abnormal value is detected from the ELF header. For example, although normal values of the ELF may be within a predetermined range, the normal values may be outside the range once the obfuscation is applied.

To this end, the security evaluation system 300 may set a normal value range with respect to at least one item among a size of a section header, a number of section headers, and a size of a section included in the ELF header, may extract a value of at least one item from the ELF header, and, if the extracted value is outside the set normal value range, may determine that the obfuscation is applied to the ELF header.

For example, in the example embodiment of FIG. 23, values extracted from the first ELF header 2310 may be included in the normal value range and values extracted from the second ELF header 2320 may be outside the normal value range. As described above, if an abnormal value is detected among the extracted values, the security evaluation system 300 may determine that the obfuscation is applied to the ELF header.

Figure 24:
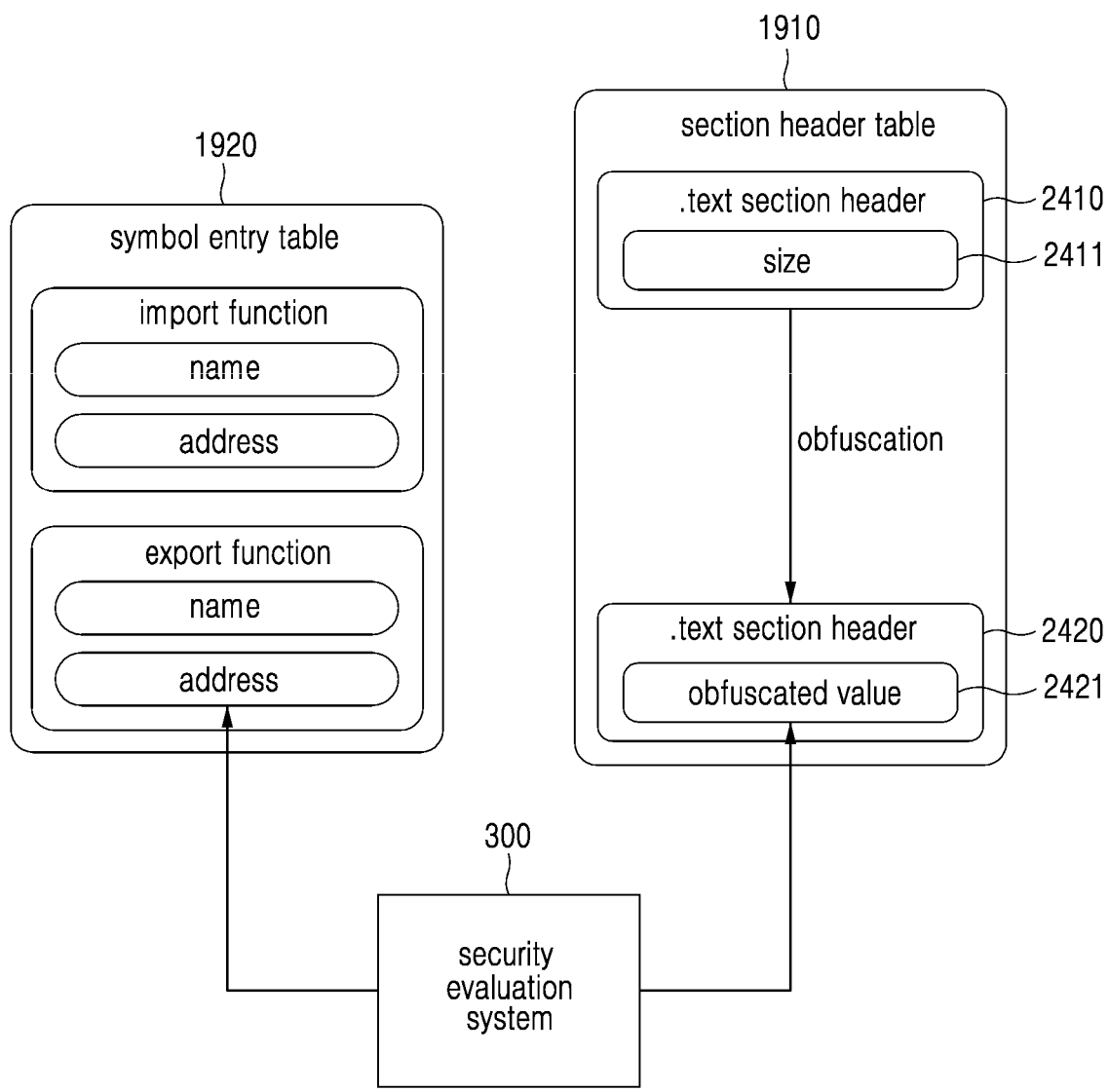
FIG. 24 illustrates an example of determining whether an obfuscation is applied to a header of a section including an execution code according to at least one example embodiment.

FIG. 24 illustrates an example of determining whether an obfuscation is applied to a header of a section including an execution code according to at least one example embodiment.

The aforementioned section header table 1910 may include a header of a section (.text section) including an execution code. Here, a normal .text section header 2410 may include a size 2411 of the execution code. There may be a scheme of adjusting the size 2411 of the execution code included in the normal .text section header 2410. FIG. 24 illustrates an example in which the normal .text section header 2410 is modified to an obfuscated .text section header 2420 including a obfuscated value 2421 by applying the obfuscation to the normal .text section header 2410.

To detect the obfuscation as above, the security evaluation system 300 may collect addresses of functions through an export symbol entry (export function of FIG. 24) from the symbol entry table 1920 included in the dynamic linking symbol table section (.dynsym section). For example, the security evaluation system 300 may repeatedly collect addresses of functions using the address of the export function and may calculate the size 2411 of the execution code using the collected addresses. Here, the security evaluation system 300 may extract the size 2411 of the execution code from the normal .text section header 2410, may compare the extracted size 2411 of the execution code to a calculated size of the execution code, and may determine that the obfuscation is not applied to the normal .text section header 2410.

If the obfuscated value 2421 is extracted from the obfuscated .text section header 2420, the obfuscated value 2421 differs from the calculated size of the execution code due to a difference with the size 2411 of the original execution code. Through this comparison, the security evaluation system 300 may determine that the obfuscation is applied to the obfuscated .text section header 2420.

Figure 25:
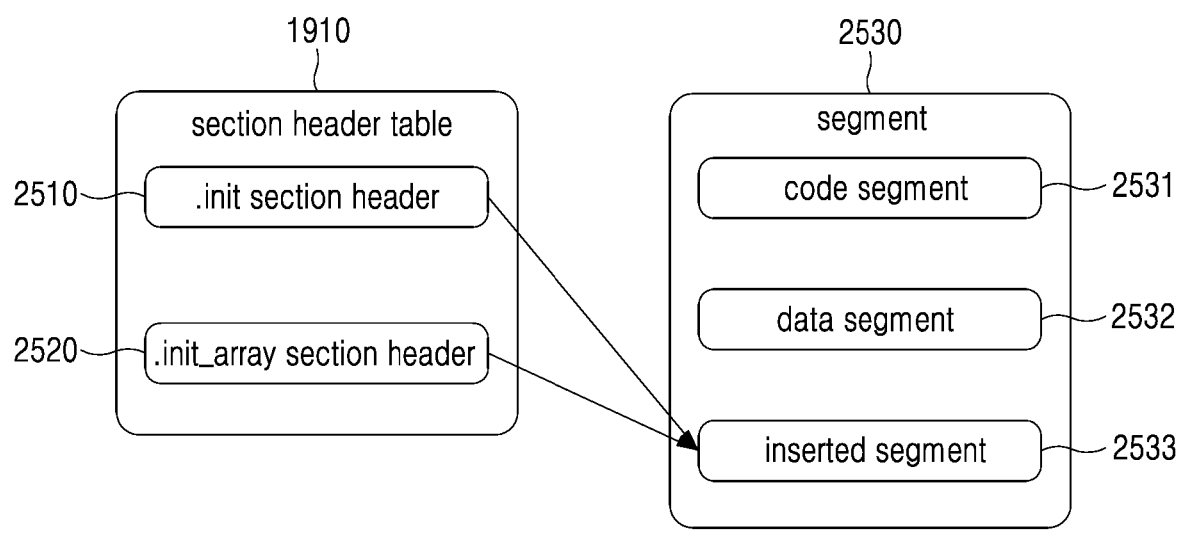
FIG. 25 illustrates an example of detecting an obfuscation for a code according to at least one example embodiment.

FIG. 25 illustrates an example of detecting an obfuscation for a code according to at least one example embodiment. The section header table 1910 may include a header of a section (.init section and/or .init_array section) including a code for a process initialization. FIG. 25 illustrates a .init section header 2510 and a .init_array section header 2520. Also, FIG. 25 illustrates a segment 2530. The segment 2530 is generated by integrating sections included in an ELF file using a linker. The .init section header 2510 and/or the .init_array section header 2520 may be configured to be most initially executed in runtime and to execute codes included in a code segment 2531 included in the segment 2530. Here, the code segment 2531 may have a Read-Write-Execute (RWE) right and a data segment 2532 may have a Read-Write (RW) right.

The code segment 2531 may include actual execution codes for executing an application. If the execution codes are obfuscated (e.g., if at least a portion of the execution codes are encrypted), and, in this instance, the codes of the code segment 2531 are executed using a normal method, the execution codes may not be normally executed due to the encrypted codes.

Accordingly, in the case of the code obfuscation, a new segment having an RWE right is inserted to restore the obfuscated code. FIG. 25 illustrates an example of adding an instruction for restoring the obfuscated code to an inserted segment 2533. Here, the .init section header 2510 and/or the .init_array section header that are most initially executed in runtime may be changed to point not the code segment 2531 but the inserted segment 2533.

To detect the obfuscation as above, the security evaluation system 300 may search for a presence of the inserted segment 2533. Here, if the inserted segment 2533 having the WRE right is present, the security evaluation system 300 may determine that the obfuscation is applied to the code segment 2531.

According to another example embodiment, the security evaluation system 300 may search for a presence of a pointing from the .init section header 2510 and/or the .init_array section header 2520 to the inserted segment 2533. Here, if the .init section header 2510 and/or the .init_array section header 2520 points the inserted segment 2533, the security evaluation system 300 may determine that the obfuscation is applied to the code segment 2531.

According to another example embodiment, if a code for restoring the obfuscated code (e.g., decrypting an encrypted code) included in the code segment 2531 is present in the inserted segment 2533 as a result of analyzing (e.g., disassembling) the inserted segment 2532, the security evaluation system 300 may determine that the obfuscation is applied to the code segment 2531.

Further, the security evaluation system 300 may determine whether the obfuscation is applied to the code by analyzing the code itself.

Figure 26:
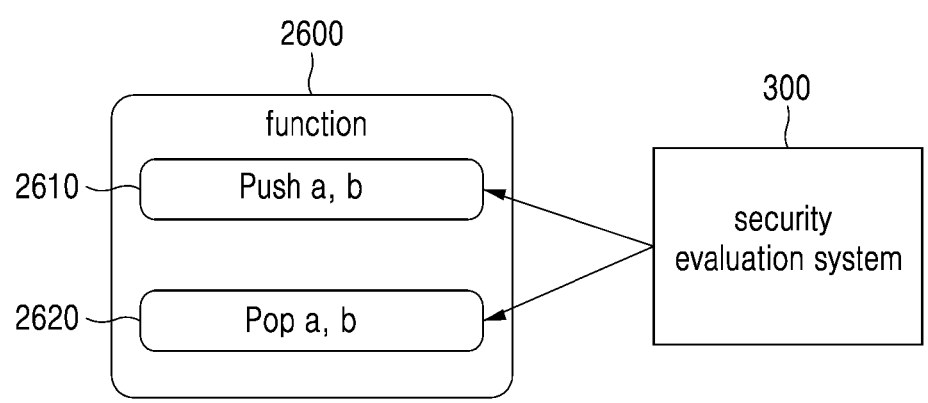
FIG. 26 illustrates an example of describing matching of a code according to at least one example embodiment.

FIG. 26 illustrates an example of describing matching of a code according to at least one example embodiment. As described above with reference to FIG. 24, the security evaluation system 300 may collect addresses of functions using an export symbol entry (the export function of FIG. 24) from the symbol entry table 1920 included in the dynamic linking symbol table section (.dynsym section). Here, the security evaluation system 300 may analyze an instruction included in each of the functions based on the collected addresses.

For example, referring to FIG. 26, instructions 'Push' and 'Pop' are instructions that are most frequently used in an assembly language. Push a, b 2610 is an instruction for storing a value of operand a, b in a stack (register) and Pop a, b 2620 is an instruction for retrieving a value of a stack top end and storing the value in operand a, b. Accordingly, the security evaluation system 300 may determine whether a pushed registered value is popped and may analyze code matching. If the pushed registered value is not popped, the security evaluation system 300 may determine that an obfuscation is applied to at least a portion of the codes.

In addition to the instructions 'Push' and 'Pop' of FIG. 26, such matching is required for between a pair of instructions stmfd and ldmfd and a pair of instructions stmdb and pop.w. The security evaluation system 300 may further analyze the matching between the pair of instructions stmfd and ldmfd and the pair of instructions stmdb and pop.w. If the matching between the instructions is absent, the security evaluation system 300 may determine that the obfuscation is applied to at least a portion of the codes.

Also, the security evaluation system 300 may determine whether the obfuscation is applied to at least a portion of the codes based on whether an absent (not-predefined) operation code (opcode) combination is present. That is, if the absent operation code combination is configured based on the obfuscation, the security evaluation system 300 may detect the obfuscation of the code.

Also, the security evaluation system 300 may determine whether the obfuscation is applied to the code based on information associated with a branch location of a branch code. For example, as described above, the security evaluation system 300 may have information associated with the entire functions through address information of the functions. Here, if a location of an instruction subsequently executed through the branch code does not correspond to locations of the functions, the security evaluation system 300 may detect the obfuscation of the code.

Figure 27:
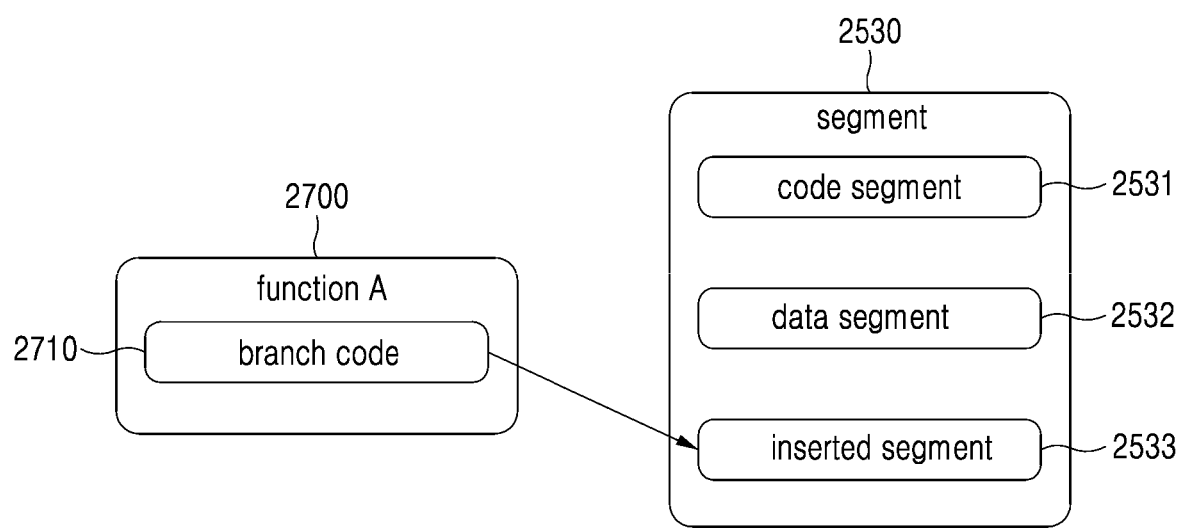
FIG. 27 illustrates an example of determining whether an obfuscation is applied to a code based on information associated with a branch location according to at least one example embodiment.

FIG. 27 illustrates an example of determining whether an obfuscation is applied to a code based on information associated with a branch location according to at least one example embodiment. FIG. 27 illustrates an example of branching to the inserted segment 2533 not the code segment 2531 of the segment 2530 of FIG. 25 through a branch code 2710 included in a function A 2700. In this case, the security evaluation system 300 may determine that the obfuscation is applied to at least a portion of codes.

Also, the security evaluation system 300 may determine whether the obfuscation is applied to a binary code based on whether a dummy code in a predefined pattern is present. The dummy code refers to a code or a plurality codes inserted to make a code analysis difficult without affecting a register and has a predetermined format. Accordingly, the security evaluation system 300 may predefine and manage information associated with a pattern of each of dummy codes. If a code or a plurality codes of a pattern managed are present, the security evaluation system 300 may determine the codes as the dummy code and may detect the dummy code inserted for the code obfuscation.

The following Table 1 shows an example of the dummy code.

TABLE 1

SUBGE SP,SP,#0x84
EORVS R2,R2, #0x9E
MOVMI R2,R2
EORVS R2,R2, #0x9E
BX PC
DCD

Also, the security evaluation system 30 may perform the obfuscation by inserting a dummy code to a source code. The dummy code may be converted to a junk code through a compile.

Figure 28:
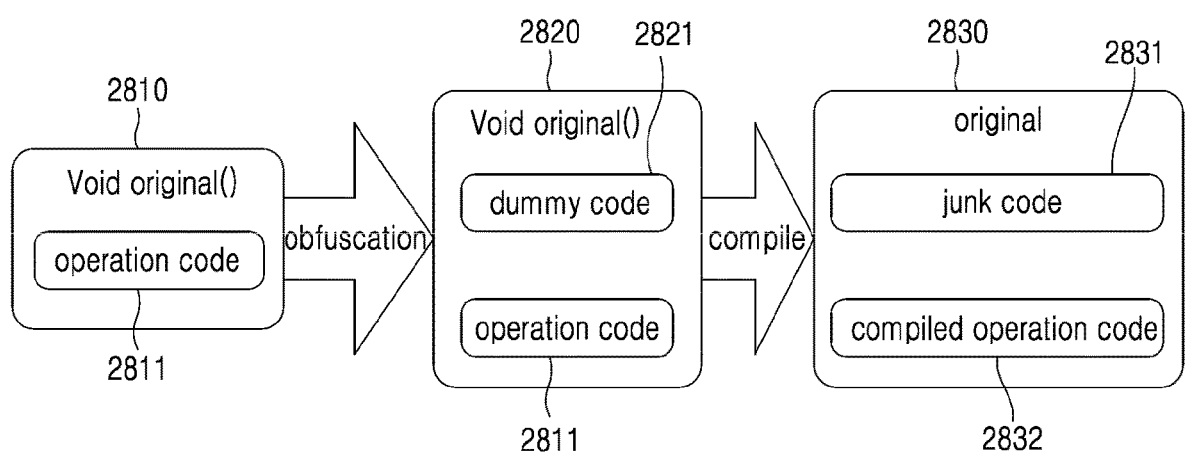
FIG. 28 illustrates an example of inserting a dummy code to a source code according to at least one example embodiment.

FIG. 28 illustrates an example of inserting a dummy code to a source code according to at least one example embodiment. FIG. 28 illustrates an example of generating an obfuscated source code 2820 by inserting a dummy code 2821 to a source code 2810 including an operation code 2811, and generating a binary code 2830 including a junk code 2831 and a compiled operation code 2832 by compiling the obfuscated source code 2820.

Here, the dummy code 2821 and the junk code 2831 may have a predefined pattern since the dummy code 2821 needs to be in a specific form capable of being compiled and effect against the original operation code 2811 or the compiled operation code 2832 needs to be free. Accordingly, the security evaluation system 300 may set or preset and manage a pattern of the dummy code 2821 and/or the junk code 2831, and may detect an obfuscation that is applied to a code in response to detecting a predefined pattern from a source code or a binary code. For example, consecutive use of an instruction ldr and/or an instruction lsls may be set as a pattern to the junk code 2831 in the binary code. In this case, the security evaluation system 300 may detect the obfuscation that is applied to the code by analyzing the binary code and by detecting a pattern in which the instruction ldr and/or the instruction lsls are repeatedly used.

Figure 29:
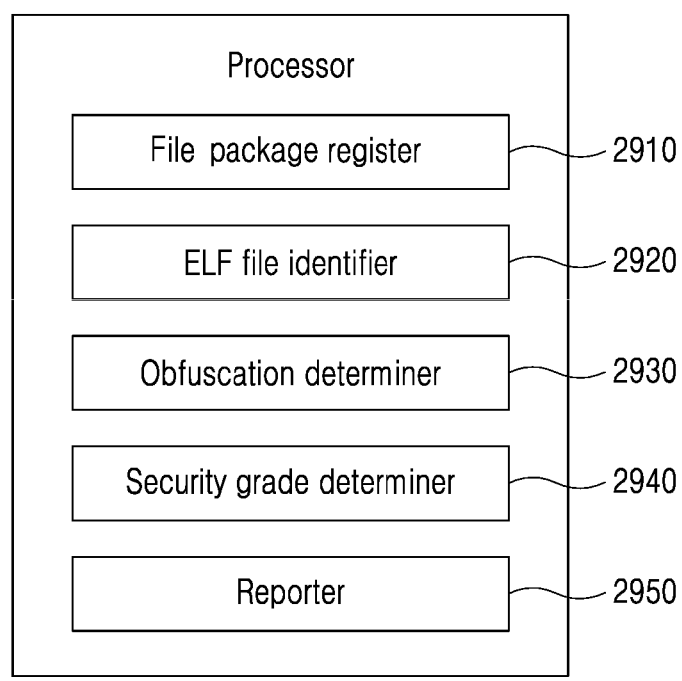
FIG. 29 is a block diagram illustrating a fourth example of a component includable in a processor of a server according to at least one example embodiment.
Figure 30:
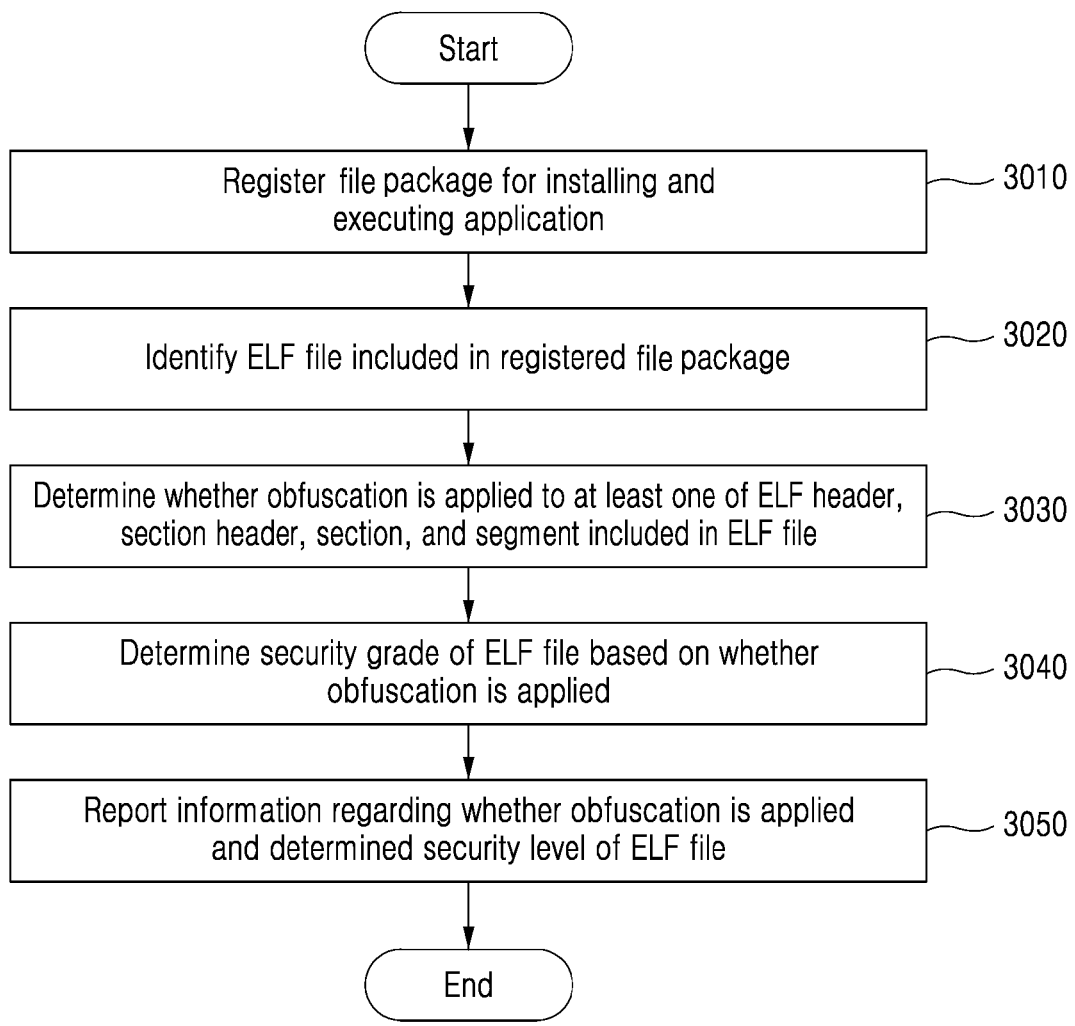
FIG. 30 is a flowchart illustrating a fourth example of a security evaluation method performed by a server according to at least one example embodiment.

FIG. 29 is a block diagram illustrating a fourth example of a component includable in a processor of a server according to at least one example embodiment, and FIG. 30 is a flowchart illustrating a fourth example of a security evaluation method performed by a server according to at least one example embodiment.

The security evaluation system 300 according to the example embodiments may be configured as a computer device such as the server 150. Referring to FIG. 29, the processor 222 of the server 150 may include a file package register 2910, an ELF file identifier 2920, an obfuscation determiner 2930, a security grade determiner 2940, and a reporter 2950 as components for configuring the security evaluation system 300. The processor 222 and the components of the processor 222 may perform operations 3010 through 3050 included in the security evaluation method of FIG. 30. Here, the processor 222 and the components of the processor 222 may be configured to execute a control instruction according to a code of at least one program or a code of an OS included in the memory 221. Here, the components of the processor 222 may be representations of different functions that are performed by the processor 222 in response to the control instruction provided from the code stored in the server 150. For example, the file package register 2910 may be used as a functional representation of the processor 222 that is controlled by the processor 222 to register a file package in response to the control instruction.

Referring to FIG. 30, in operation 3010, the file package register 2910 may register a file package for installing and executing an application. The file package may be registered to an application publisher in order to be distributed to users of the application. As described above, the security evaluation system 300 may be configured in an apparatus that provides a service so that the application publisher may distribute a file package of applications registered to the application publisher or as a separate system that communicates with the apparatus over the network 170. For example, the security evaluation system 300 may receive and register the file package registered to the application publisher through the network 170. As described above, the file package may include an APK.

In operation 3020, the ELF file identifier 2920 may identify an ELF file included in the registered file package. For example, if the file package is an APK, a PE file may be a so file. The ELF file to be identified may be identified based on an extension of a file from among files identified by the package decomposition module 310 and the file identifying module 320 of FIG. 3.

In operation 3030, the obfuscation determiner 2930 may determine whether an obfuscation is applied to at least one of an ELF header, a section header, a section, and a segment included in the ELF file. Various example embodiments of determining whether the obfuscation is applied are described above. Hereinafter, operations of the obfuscation determiner 2930 according to the various example embodiments will be further described with reference to the accompanying drawings.

In operation 3040, the security grade determiner 2940 may determine a security grade of the ELF file based on whether the obfuscation is applied. For example, the security grade of the ELF file may be determined based on whether the obfuscation is applied to the ELF file, a type or a grade of the obfuscation applied to the ELF file, and the like. The type of the obfuscation is described above with reference to the various example embodiments. The grade of the obfuscation may be determined based on, for example, a number of types of the applied obfuscation, a code matching level, and the like.

In operation 3050, the reporter 2950 may report information regarding whether the obfuscation is applied and information associated with the determined security grade of the ELF file. For example, a variety of information, such as whether the obfuscation is applied to the section header, whether the obfuscation is applied to a string and/or a string table, whether the obfuscation is applied to a symbol table, whether the obfuscation is applied to a code, etc., may be provided to an administrator or a user of the security evaluation system 300 in association with the identified ELF file.

Figure 31:
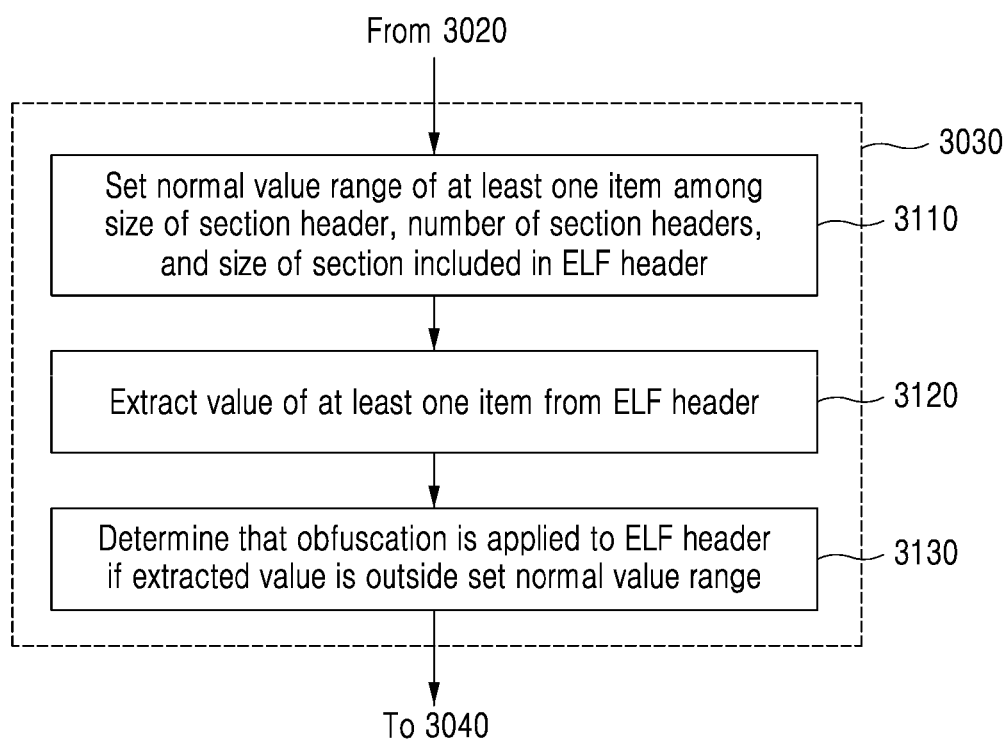
FIG. 31 is a flowchart illustrating an example of a method of determining whether an obfuscation is applied to an ELF header according to at least one example embodiment.

FIG. 31 is a flowchart illustrating an example of a method of determining whether an obfuscation is applied to an ELF header according to at least one example embodiment. Operations 3110 through 3130 of FIG. 31 may be included in operation 3030 of FIG. 30. Here, operation 3110 may be included in operation 3030 and may also be performed before operation 3030.

Referring to FIG. 31, in operation 3110, the obfuscation determiner 2930 may set a normal value range of at least one item among a size of a section header, a number of section headers, and a size of a section that are included in the ELF header.

In operation 3120, the obfuscation determiner 2930 may extract a value of at least one item from the ELF header. If the ELF header is not obfuscated, a value included in the normal value range may be extracted. If the ELF header is obfuscated, a value outside the normal value range may be extracted.

In operation 3130, if the extracted value is outside the set normal value range, the obfuscation determiner 2930 may determine that the obfuscation is applied to the ELF header. That is, the obfuscation determiner 2930 may set or preset the normal value range of at least one item among the size of the section header, the number of section headers, and the size of the section, and may use the set or preset normal value range to determine whether the obfuscation is applied to the ELF header of the ELF file. Such obfuscation detection associated with the ELF header is described with reference to FIG. 23.

Figure 32:
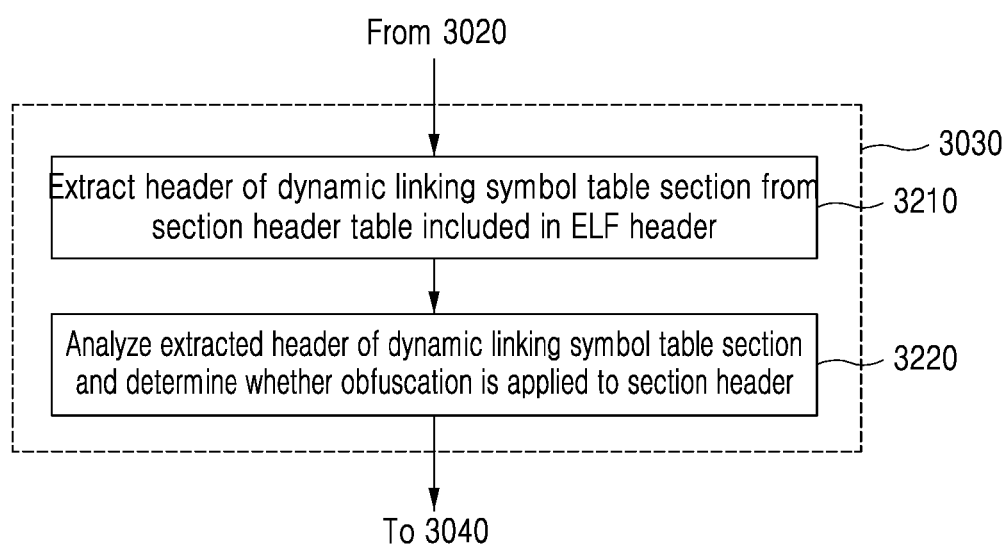
FIG. 32 is a flowchart illustrating an example of a method of determining whether an obfuscation is applied to a header of a dynamic linking symbol table section (.dynsym section) according to at least one example embodiment.

FIG. 32 is a flowchart illustrating an example of a method of determining whether an obfuscation is applied to a header of a dynamic linking symbol table section (.dynsym section) according to at least one example embodiment. Operations 3210 and 3220 of FIG. 32 may be included in operation 3030.

Referring to FIG. 32, in operation 3210, the obfuscation determiner 2930 may extract a header of a dynamic linking symbol table section (.dynsym section) from a section header table included in the ELF header.

In operation 3220, the obfuscation determiner 2930 may analyze the extracted header of the dynamic linking symbol table section and may determine whether an obfuscation is applied to a section header. To this end, the obfuscation determiner 2930 may determine that the obfuscation is applied to the section header if any one of a first condition that the extracted header of the dynamic linking symbol table section includes a null value, a second condition that the extracted header of the dynamic linking symbol table section is incapable of being parsed, and a third condition that information included in the extracted header of the dynamic linking symbol table section is absent in the dynamic linking information section (.dynamic section) is met. Such obfuscation detection associated with the header of the dynamic linking symbol table section (.dynsym section) is described above with reference to FIGS. 19 and 20.

Figure 33:
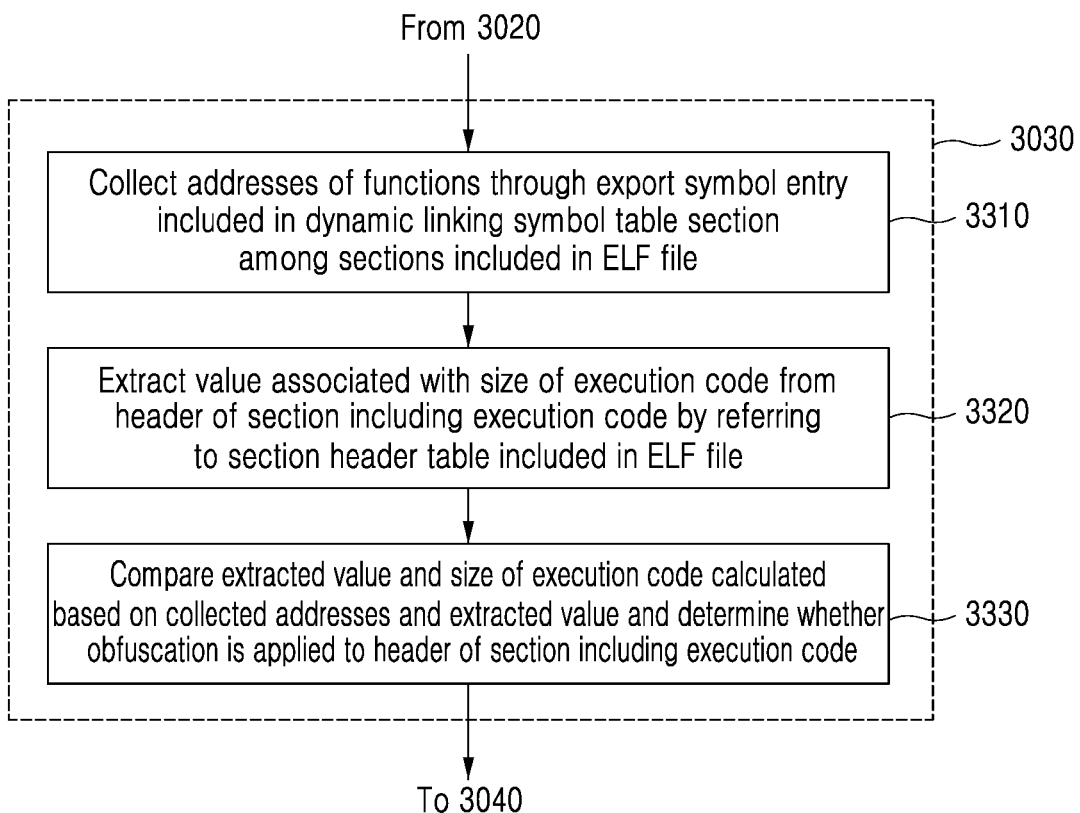
FIG. 33 is a flowchart illustrating an example of a method of determining whether an obfuscation is applied to a header of a section including an execution code according to at least one example embodiment.

FIG. 33 is a flowchart illustrating an example of a method of determining whether an obfuscation is applied to a header of a section including an execution code according to at least one example embodiment. Operations 3310 through 3330 of FIG. 33 may be included in operation 3030 of FIG. 30.

Referring to FIG. 33, in operation 3310, the obfuscation determiner 2930 may collect addresses of functions through an export symbol entry included in the dynamic linking symbol table section (.dynsym section) among sections included in the ELF file. For example, the obfuscation determiner 2930 may disassemble an address of the export symbol entry, may track entire functions, and may collect addresses of the functions.

In operation 3320, the obfuscation determiner 2930 may extract a value associated with a size of an execution code from a header of a section (.text section) including the execution code by referring to a section header table included in the ELF file. If the header of the section (.text section) including the execution code is obfuscated, a value to be extracted may differ from a value that is calculated based on the collected addresses.

In operation 3330, the obfuscation determiner 2930 may compare the extracted value and the size of the execution code calculated based on the collected addresses and may determine whether the obfuscation is applied to the header of the section including the execution code. That is, if the calculated value and the extracted value differ from each other, the obfuscation determiner 2930 may detect the obfuscation associated with the header of the section including the execution code. Such obfuscation detection associated with the header of the section including the execution code is described with reference to FIG. 24.

Figure 34:
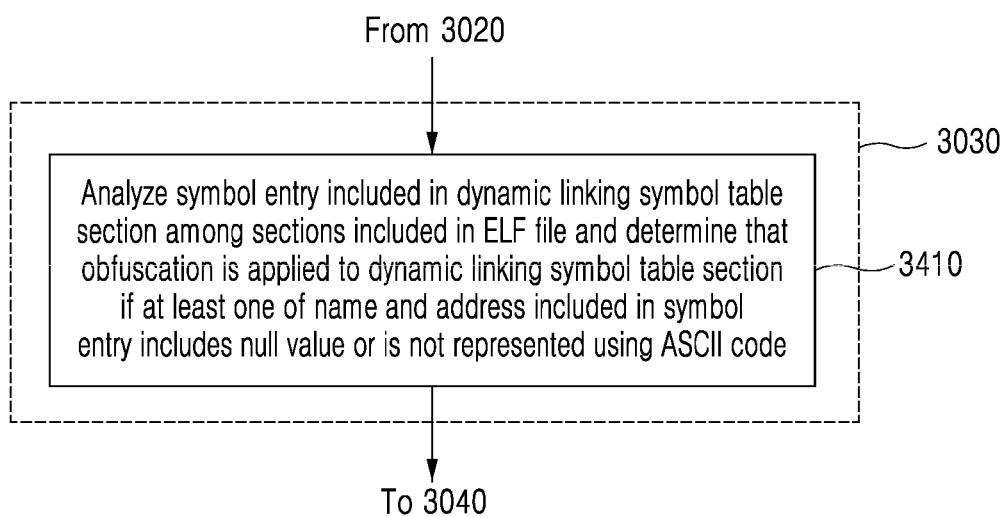
FIG. 34 is a flowchart illustrating an example of a method of determining whether an obfuscation is applied to a dynamic linking symbol table section according to at least one example embodiment.

FIG. 34 is a flowchart illustrating an example of a method of determining whether an obfuscation is applied to a dynamic linking symbol table section according to at least one example embodiment. Operation 3410 of FIG. 34 may be included in operation 3030 of FIG. 30.

Referring to FIG. 34, in operation 3410, the obfuscation determiner 2930 may analyze a symbol entry included in the dynamic linking symbol table section (.dynsym section) among sections included in the ELF file, and, if at least one of a name and an address included in the symbol entry includes a null value or is not represented using an ASCII code, may determine that the obfuscation is applied to the dynamic linking symbol table section. Such obfuscation detection process is described above with reference to FIG. 21.

Figure 35:
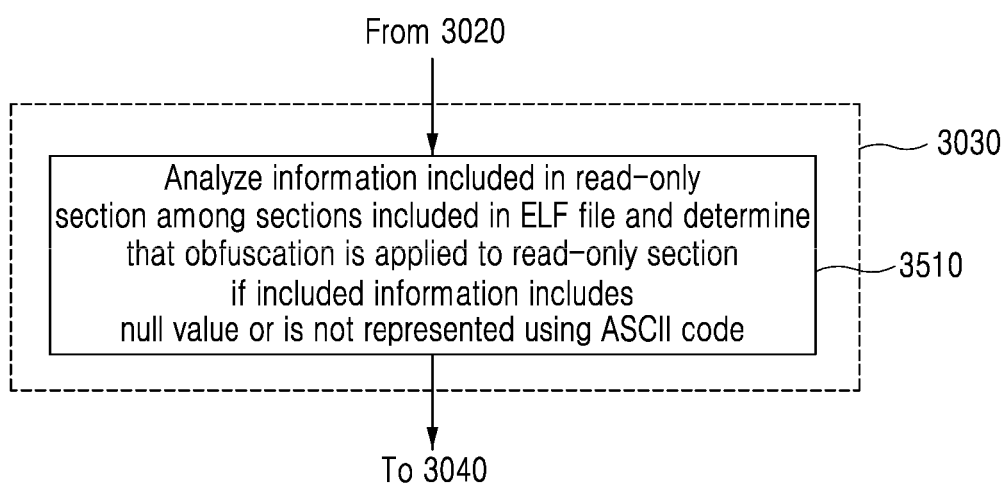
FIG. 35 is a flowchart illustrating an example of a method of determining whether an obfuscation is applied to a read-only section according to at least one example embodiment.

FIG. 35 is a flowchart illustrating an example of a method of determining whether an obfuscation is applied to a read-only section according to at least one example embodiment. Operation 3510 of FIG. 35 may be included in operation 3030 of FIG. 30.

Referring to FIG. 35, in operation 3510, the obfuscation determiner 2930 may analyze information included in the read-only section among sections included in the ELF file, and, if the included information includes a null value or is not represented using an ASCII code, may determine that the obfuscation is applied to the read-only section. The read-only section may include a .rdata section or a .rodata section. Such obfuscation detection associated with the sections is described above with reference to FIG. 22.

Figure 36:
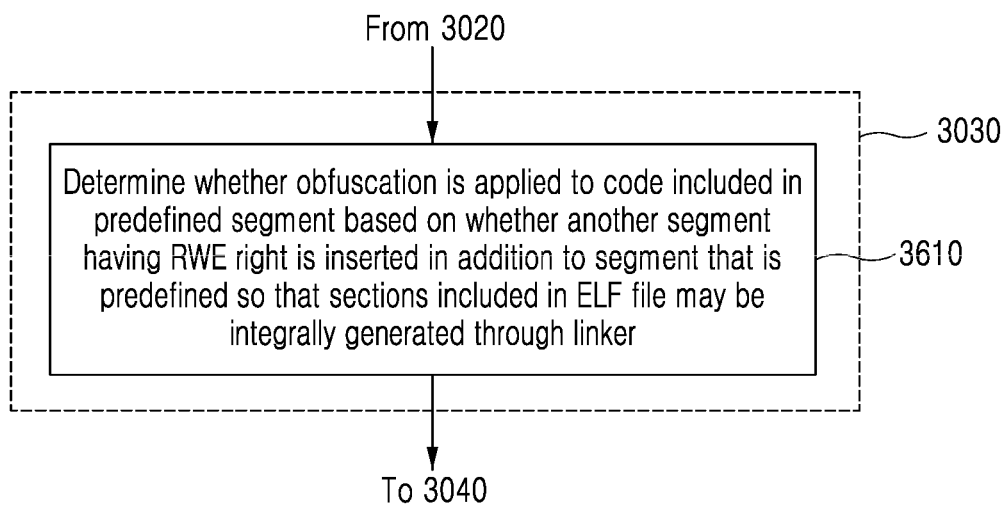
FIG. 36 is a flowchart illustrating a first example of a method of determining whether an obfuscation is applied to a code according to at least one example embodiment.

FIG. 36 is a flowchart illustrating a first example of a method of determining whether an obfuscation is applied to a code according to at least one example embodiment. Operation 3610 of FIG. 36 may be included in operation 3030 of FIG. 30.

Referring to FIG. 36, in operation 3610, the obfuscation determiner 2930 may determine whether the obfuscation is applied to a code included in a predefined segment based on whether another segment having an RWE right is inserted in addition to the segment that is predefined so that sections included in the ELF file may be integrally generated through a linker. The inserted segment 2533 is described with reference to FIG. 25. This segment insertion may indicate that the obfuscation is applied to the code. Accordingly, the obfuscation determiner 2930 may translate inserting of the other segment having the RWE right as application of the obfuscation to the code.

Figure 37:
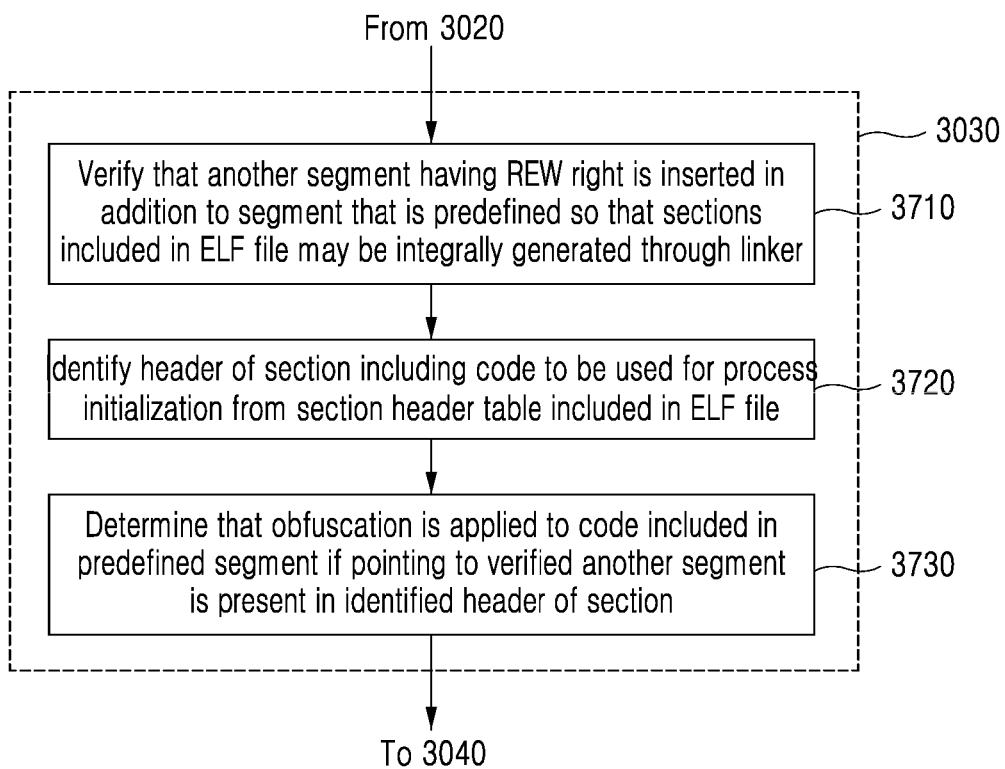
FIG. 37 is a flowchart illustrating a second example of a method of determining whether an obfuscation is applied to a code according to at least one example embodiment.

FIG. 37 is a flowchart illustrating a second example of a method of determining whether an obfuscation is applied to a code according to at least one example embodiment. Operations 3710 through 3730 of FIG. 37 may be included in operation 3030 of FIG. 30.

Referring to FIG. 37, in operation 3710, the obfuscation determiner 2930 may verify that another segment having the RWE right is inserted in addition to the segment that is predefined so that sections included in the ELF file may be integrally generated through a linker.

In operation 3720, the obfuscation determiner 2930 may identify a header of a section (.init section or .init_array section) including a code to be used for a process initialization from a section header table included in the ELF file.

In operation 3730, if a pointing from the identified header of the section to verified another segment is present, the obfuscation determiner 2930 may determine that the obfuscation is applied to the code included in the predefined segment.

As described above with reference to FIG. 25, if the code is obfuscated, a code for restoring the obfuscated code may be required and a segment for inserting the code may be inserted. Also, the header of the section (.init section or .init_array section) including the code for the process initialization that is most initially executed in runtime points the segment inserted to restore the obfuscated code. Accordingly, the obfuscation determiner 2930 may detect the pointing from the .init section or the .init_array section to the inserted segment and may detect the detected pointing as the obfuscation associated with the code included in the predefined segment (e.g., the code segment 2531 of FIG. 25).

Figure 38:
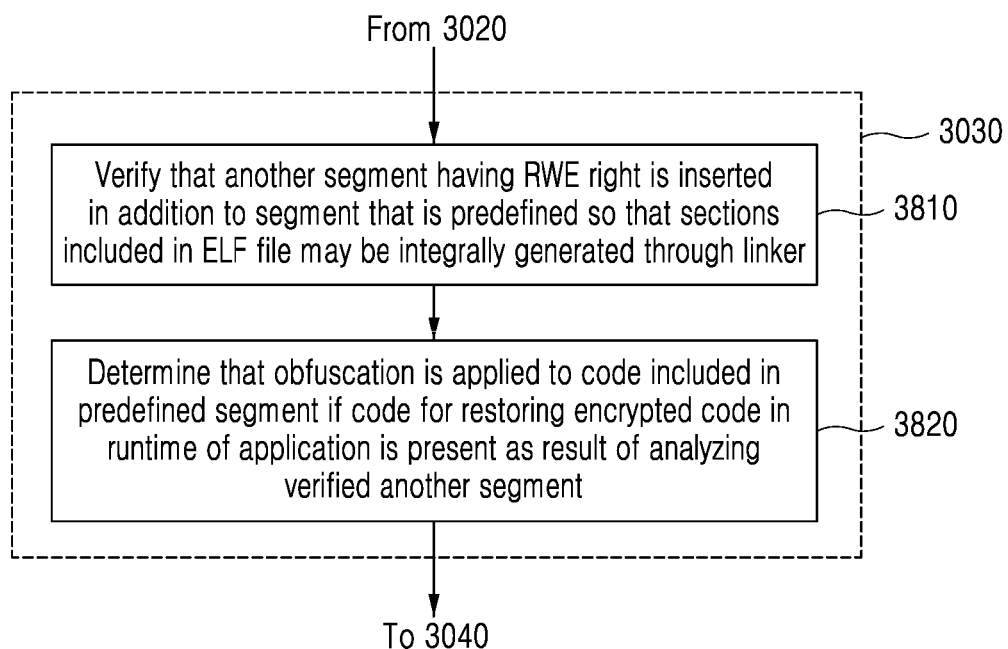
FIG. 38 is a flowchart illustrating a third example of a method of determining whether an obfuscation is applied to a code according to at least one example embodiment.

FIG. 38 is a flowchart illustrating a third example of a method of determining whether an obfuscation is applied to a code according to at least one example embodiment. Operations 3810 and 3820 of FIG. 38 may be included in operation 3030 of FIG. 30.

Referring to FIG. 38, in operation 3810, the obfuscation determiner 2930 may verify that another segment having an RWE right is inserted in addition to the segment that is predefined so that sections included in the ELF file may be integrally generated through a linker.

In operation 3820, if a code for restoring an encrypted code in runtime of an application is present as a result of analyzing verified another segment, the obfuscation determiner 2930 may determine that the obfuscation is applied to the code included in the predefined segment.

As described above, if the code is obfuscated, a code for restoring the obfuscated code may be required and a segment for inserting the code may be inserted. Accordingly, the obfuscation determiner 2930 may analyze the inserted segment, may verify whether the code for restoring the encrypted code is present, and may detect a presence of the code as the obfuscation of the code included in the predefined segment (e.g., the code segment 2531 of FIG. 25).

Figure 39:
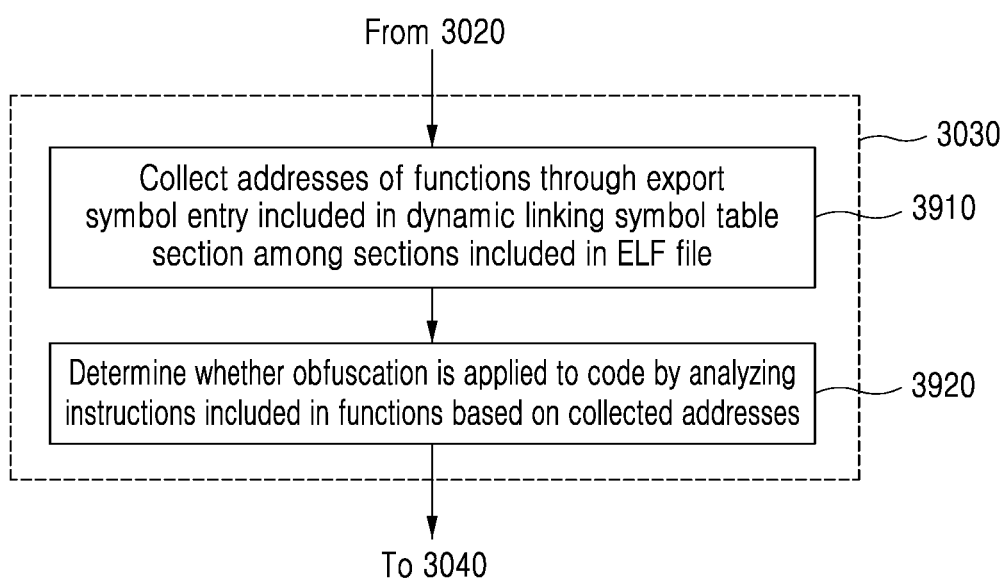
FIG. 39 is a flowchart illustrating an example of a method of analyzing an instruction and determining whether an obfuscation is applied to a code according to at least one example embodiment.

FIG. 39 is a flowchart illustrating an example of a method of analyzing an instruction and determining whether an obfuscation is applied to a code according to at least one example embodiment. Operations 3910 and 3920 of FIG. 39 may be included in operation 3030 of FIG. 30.

Referring to FIG. 39, in operation 3910, the obfuscation determiner 2930 may collect addresses of functions through an export symbol entry included in a dynamic linking symbol table section (.dynsym section) among sections included in the ELF file.

In operation 3920, the obfuscation determiner 2930 may determine whether the obfuscation is applied to a code by analyzing instructions included in the functions based on the collected addresses.

Here, the obfuscation determiner 2930 may determine whether the obfuscation is applied to the code based on at least one of matching between the instructions included in the functions, whether an undefined operation code (opcode) combination is present, information associated with a branch location of a branch code, and whether a dummy code of a predefined pattern is present.

For example, the obfuscation determiner 2930 may verify insertion of another segment having an RWE right in addition to a segment that is predefined so that the sections included in the ELF file may be integrally generated through a linker and, if the instructions included in the functions branch to a code included to the other segment, may determine that the obfuscation is applied to the code.

Operations of FIGS. 31 through 39 may be performed in parallel within operation 3030. Also, in the case of performing such operations in parallel, operations of performing the same may be performed only once instead of being repeatedly performed. For example, only one of operations 3310 and 3910 of collecting addresses of functions may be performed.

Figure 40:
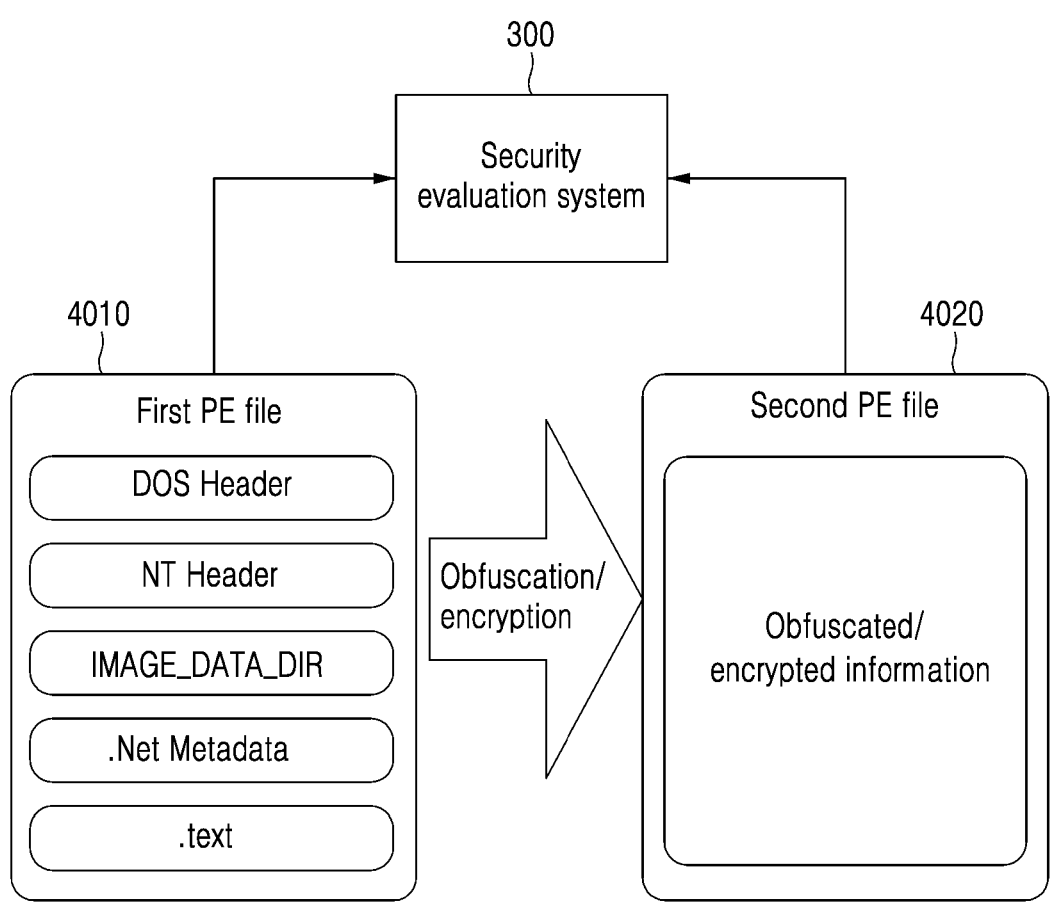
FIG. 40 illustrates an example of a Portable Executable (PE) file included in a registered file package according to at least one example embodiment.

FIG. 40 illustrates an example of a Portable Executable (PE) file included in a registered file package according to at least one example embodiment. A PE file to which an obfuscation is applied and a PE file to which the obfuscation is not applied may be included in a file package that is registered to the security evaluation system 300. Here, the security evaluation system 300 may determine whether the obfuscation is applied to the PE file included in the file package. A structure of the PE file is well known and thus, may be easily understood by one of ordinary skill in the art without a separate description. For example, a Dynamic Linking Library (DLL) included in an APK may be included as the PE file of the registered file package.

Here, FIG. 40 illustrates an example of a first PE file 4010 to which the obfuscation is not applied and a second PE file 4020 to which the obfuscation is applied by encrypting the entire binary included in the file. For example, if the registered file package includes the second PE file 4020, the registered file package may further include, in another file, information used to decrypt encrypted information in the second PE file 4020. Here, if an application is installed and executed on an electronic device (e.g., the electronic device 110) through the file package, encrypted information of the second PE file 4020 may be decrypted based on information that is included in the other file to be used for decryption. Accordingly, the application may be normally executed.

Figure 41:
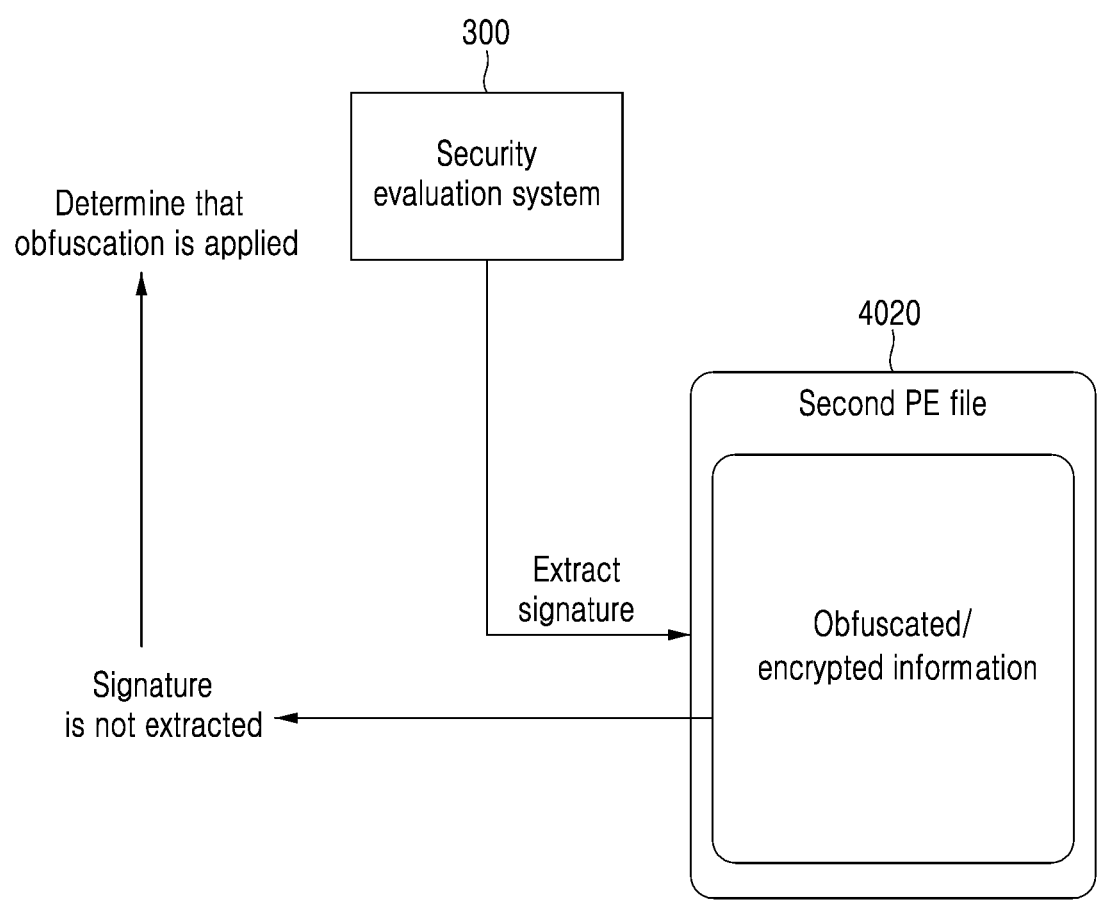
FIG. 41 illustrates an example of a process of determining whether an obfuscation is applied to a PE file in which an entire binary is encrypted according to at least one example embodiment.

FIG. 41 illustrates an example of a process of determining whether an obfuscation is applied to a PE file in which an entire binary is encrypted according to at least one example embodiment. If the entire binary is encrypted as in the second PE file 4020 of FIG. 40, a normal value (e.g., a value that is constantly included in a header of the PE file) may not be extracted from the second PE file 4020. For example, a general header of the PE file may be configured using a DOS header, a DOS stub, a PE header, and a section table. Here, the DOS header may include a total of 64 bytes and may be predefined to start with a signature "MZ" of the DOS header. Accordingly, if the predefined value "MZ" is not extracted from the DOS header as a result of attempting to extract the signature from the DOS header, the security evaluation system 300 may be aware that the corresponding PE file is obfuscated. Also, a signature "BSJB" may be used for a .Net header.

FIG. 41 illustrates an example in which the security evaluation system 300 attempts to extract a signature from the header of the second PE file 4020 of FIG. 40. Here, since the entire binary is encrypted or obfuscated in the second PE file 4020, a desired signature may not be extracted. Accordingly, the security evaluation system 300 may verify that the obfuscation is applied to the second PE file 4020.

Depending on example embodiments, the security evaluation system 300 may attempt to extract a plurality of different signatures. Here, a score may be assigned based on whether each of the attempted signatures is extracted and a dangerous grade over security of the PE file may be set based on the score. In this case, as the score decreases, the security of the PE file may be set to be high and inversely, the dangerous grade may be set to be low. For example, if the signature of the DOS header is not extracted and the signature of the .Net header is extracted, the security evaluation system 300 may determine that the encryption or the obfuscation is applied only to a portion of the entire binary of the PE file. In this case, the security may be set to be relatively low and the dangerous grade may be set to be relatively high compared to a case in which the entire binary is encrypted or obfuscated.

Meanwhile, the obfuscation may be applied to the PE file using a scheme of performing encryption by designating only a specific class or a specific method in an execution code. The execution code may be included in the '.text' section of FIG. 40.

Figure 42:
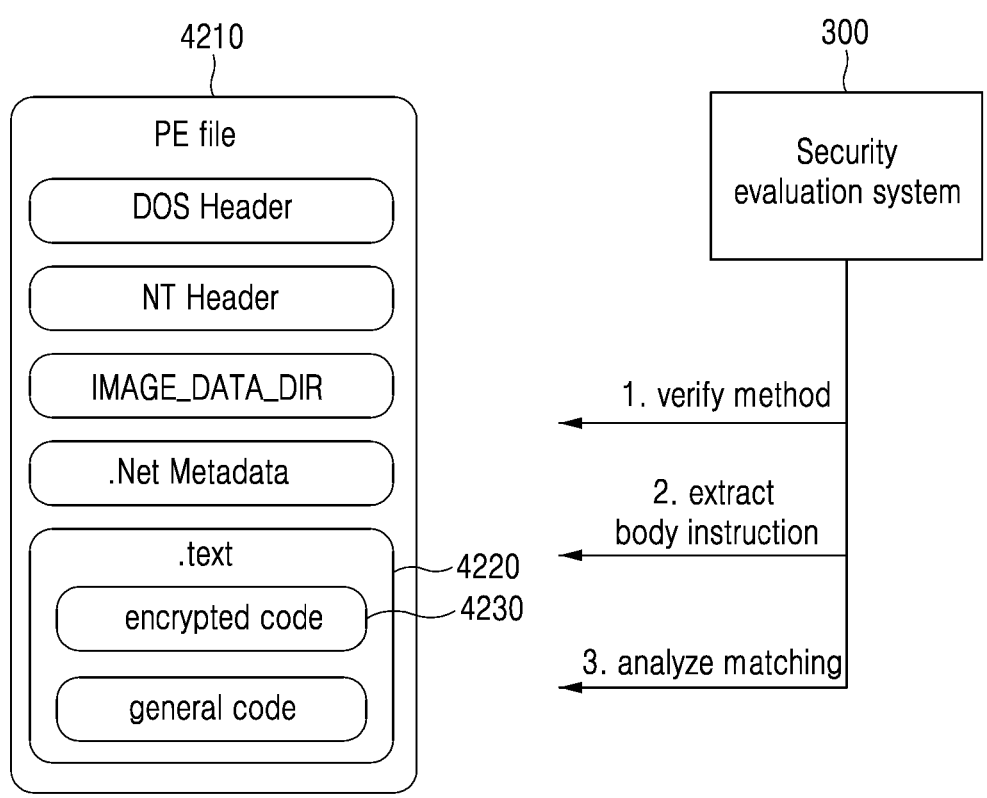
FIG. 42 illustrates an example of a PE file in which a specific class or a specific method is encrypted according to at least one example embodiment.

FIG. 42 illustrates an example of a PE file in which a specific class or a specific method is encrypted according to at least one example embodiment. FIG. 42 illustrates an example of including an encrypted code 4230 in response to encrypting a specific method in a .text section 4220 of a PE file 4210. The security evaluation system 300 may not know whether an obfuscation through the encryption is applied to the PE file 4210. Thus, there is a need to perform a process of determining whether the obfuscation is applied.

The security evaluation system 300 is unaware of a class and a method that are present in the PE file 4210 and thus, may preferentially parse and analyze a metadata table included in the PE file 4210. For example, the security evaluation system 300 may secure a class list by parsing/analyzing 'MethodDef' table, 'ModuleRef' table, 'TypeRef' table and 'TypeDef' table among a total of 42 metadata tables included in .Net 2.0. That is, through a process of analyzing the metadata tables as above, the security evaluation system 300 may verify a class that is present in the PE file 4210 and a method that is included in each class.

Accordingly, the security evaluation system 300 may verify the entire methods and may determine whether an encryption or an obfuscation is applied to each of the entire methods. To this end, the security evaluation system 300 may acquire a Relative Virtual Address (RVA) indicating a relative address value from a virtual memory of a method, and may extract a body instruction of the method from the .text section 4220.

Here, the security evaluation system 300 may analyze matching of an instruction operation code (opcode) included in the extracted body instruction and may determine whether the obfuscation is applied to a method corresponding to the extracted body instruction.

Here, the instruction may include a 1-byte instruction and a 2-byte instruction. A conventional scheme is used to parse such instructions. For example, in the conventional scheme, 1-byte data is read from a body instruction for parsing a method, and if the value is included in the range of '0x00~0xE0', the read 1-byte data may be verified to be the 1-byte instruction. On the contrary, if the value is not included in the range of '0x00~0xE0', 2-byte data is read from the body instruction and whether a first byte value is 0xFE and a second byte value is included in the range of '0x00~0x1E' may be verified. Here, if the first byte value is 0xFE and the second byte value is included in the range of '0x00~0x1E', the read 2-byte data may be verified to be the 2-byte instruction. Also, the conventional scheme may acquire a subsequent instruction by analyzing an additional operation code suitable for each instruction. For example, if the instruction is the 1-byte instruction and an instruction of 'int32 type', the subsequent instruction may be acquired at a location after 5 bytes (1 byte+4 bytes (32 bits)).

However, if the method is encrypted, the instruction may not be acquired using the above scheme. Accordingly, the security evaluation system 300 may perform a general parsing operation on the extracted body instruction and, if at least one instruction is not normally parsed, may verify that the obfuscation is applied to the corresponding method.

Here, the security evaluation system 300 may perform the parsing operation on each of the entire methods and may determine obfuscated methods among the entire methods. In this case, the security evaluation system 300 may determine a security grade of the PE file 4210 based on a ratio of the obfuscated methods to the entire methods.

Figure 43:
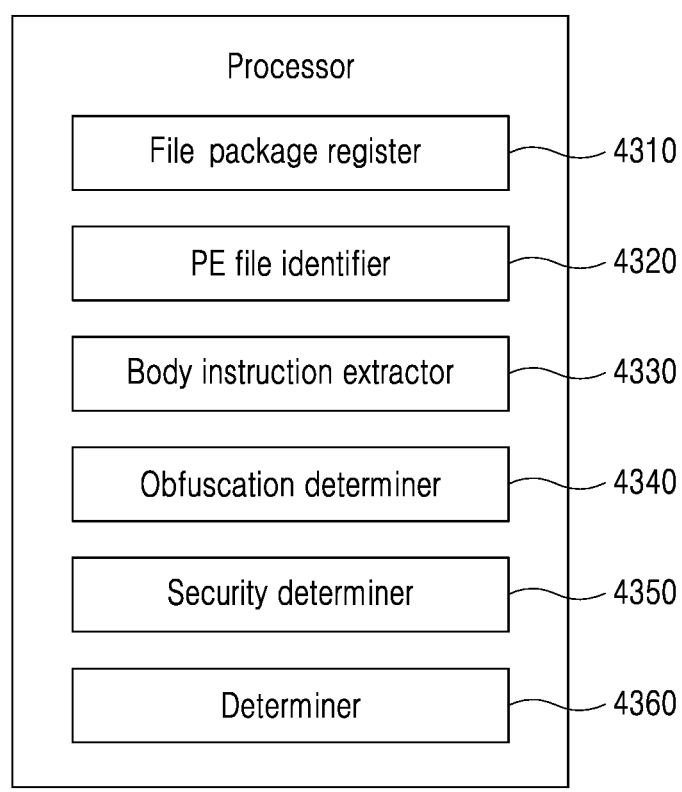
FIG. 43 is a block diagram illustrating a fifth example of a component includable in a processor of a server according to at least one example embodiment.
Figure 44:
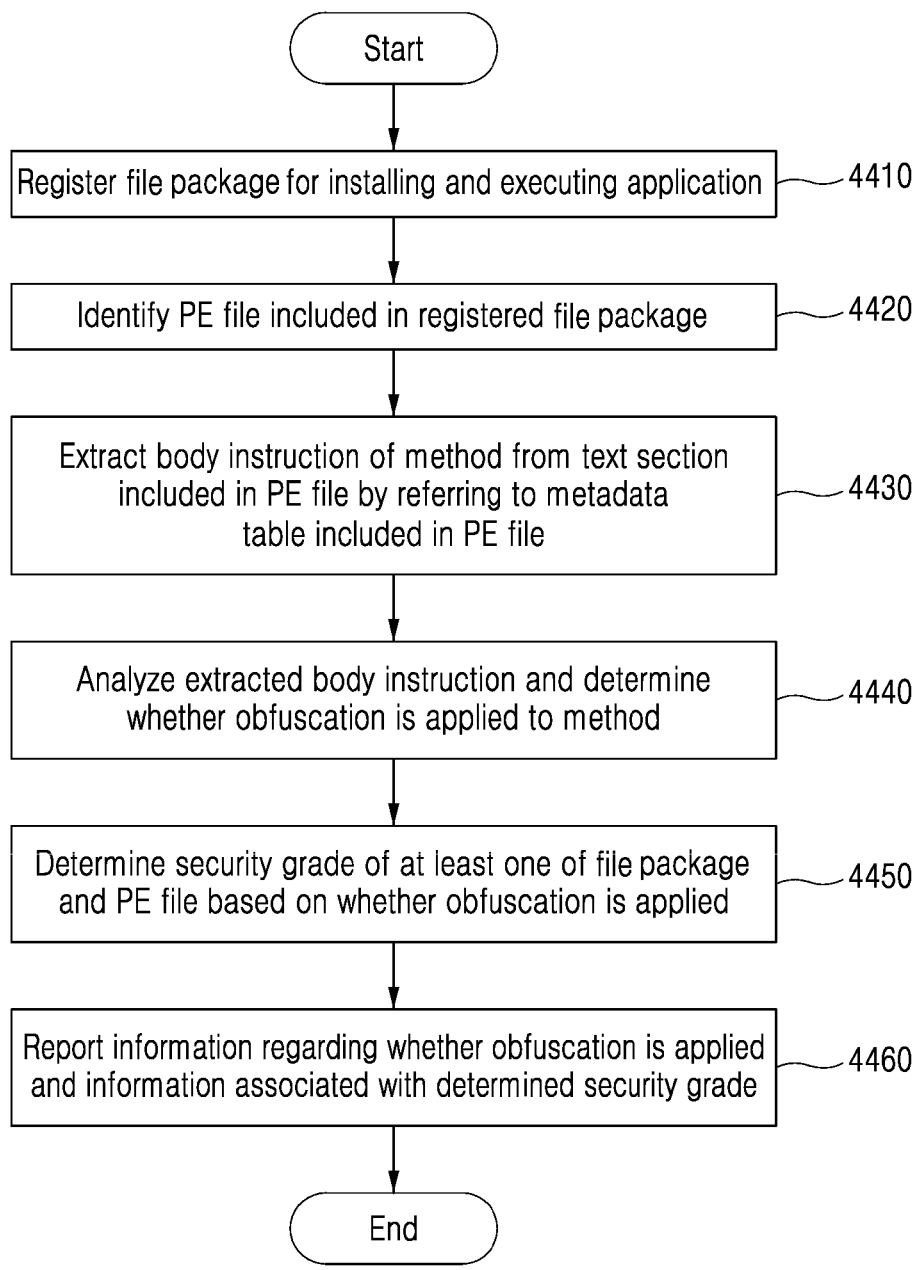
FIG. 44 is a flowchart illustrating a fifth example of a security evaluation method performed by a server according to at least one example embodiment.

FIG. 43 is a block diagram illustrating a fifth example of a component includable in a processor of a server according to at least one example embodiment, and FIG. 44 is a flowchart illustrating a fifth example of a security evaluation method performed by a server according to at least one example embodiment.

The security evaluation system 300 according to the example embodiments may be configured as a computer device, such as the server 150. Referring to FIG. 43, the processor 222 of the server 150 may include a file package register 4310, a PE file identifier 4320, a body instruction extractor 4330, an obfuscation determiner 4340, a security determiner 4350, and an information provider 4360 as components for configuring the security evaluation system 300. The processor 222 and the components of the processor 222 may perform operations 4410 through 4460 included in the security evaluation method of FIG. 44. Here, the processor 22 and the components of the processor 222 may be configured to execute a control instruction according to a code of at least one program or a code of an OS included in the memory 221. Here, the components of the processor 222 may be representations of different functions that are performed by the processor 222 in response to the control code provided from a code stored in the server 150. For example, the file package register 4310 may be used as a functional representation of the processor 222 that is controlled by the processor 222 to register a file package in response to the control instruction.

Referring to FIG. 44, in operation 4410, the file package register 4310 may register a file package for installing and executing an application. The file package may be registered to an application publisher in order to be distributed to users of the application. As described above, the security evaluation system 300 may be configured as an apparatus that provides a service so that the application publisher may distribute a file package of applications registered to the application publisher or as a separate system that communicates with the apparatus over the network 170. For example, the security evaluation system 300 may receive and register the file package registered to the application publisher through the network 170. The package may include an APK.

In operation 4420, the PE file identifier 4320 may identify a PE file included in the registered file package. For example, if the file package is an APK, the PE file may be a DLL file. The PE file to be identified may be identified based on an extension of a file from among files identified by the package decomposition module 310 and the file identifying module 320 of FIG. 3.

In operation 4430, the body instruction extractor 4330 may extract a body instruction of a method from a text section included in the PE file by referring to a metadata table included in the PE file. As described above, the body instruction extractor 4330 may recognize a class and a method included in the text section of the PE file, may acquire an RVA for each method, and may extract a required body instruction of the method from the text section.

In operation 4440, the obfuscation determiner 4340 may analyze the extracted body instruction and may determine whether an obfuscation is applied to the method. As described above, whether the obfuscation is applied to the method corresponding to the extracted body instruction may be determined by analyzing matching of an instruction operation code (opcode) included in the extracted body instruction. Whether the application is applied as above may be determined with respect to each of the entire identified methods.

In operation 4450, the security determiner 4350 may determine a security grade of at least one of the file package and the PE file based on whether the obfuscation is applied. For example, the security determiner 4350 may determine the security grade or a dangerous grade based on a ratio of obfuscated methods to the entire methods included in a text section. Here, according to an increase in the ratio, the security grade may relatively increase and inversely, the dangerous grade may decrease.

In operation 4460, the information provider 4360 may report information regarding whether the obfuscation is applied and information associated with the determined security grade. For example, information regarding whether the obfuscation is applied to a method, a total number of classes, a number of obfuscated classes, a total number of methods, a number of obfuscated methods, the ratio, the security grade or the dangerous grade, and the like, with respect to the identified PE file may be provided to an administrator or a user of the security evaluation system 300.

Figure 45:
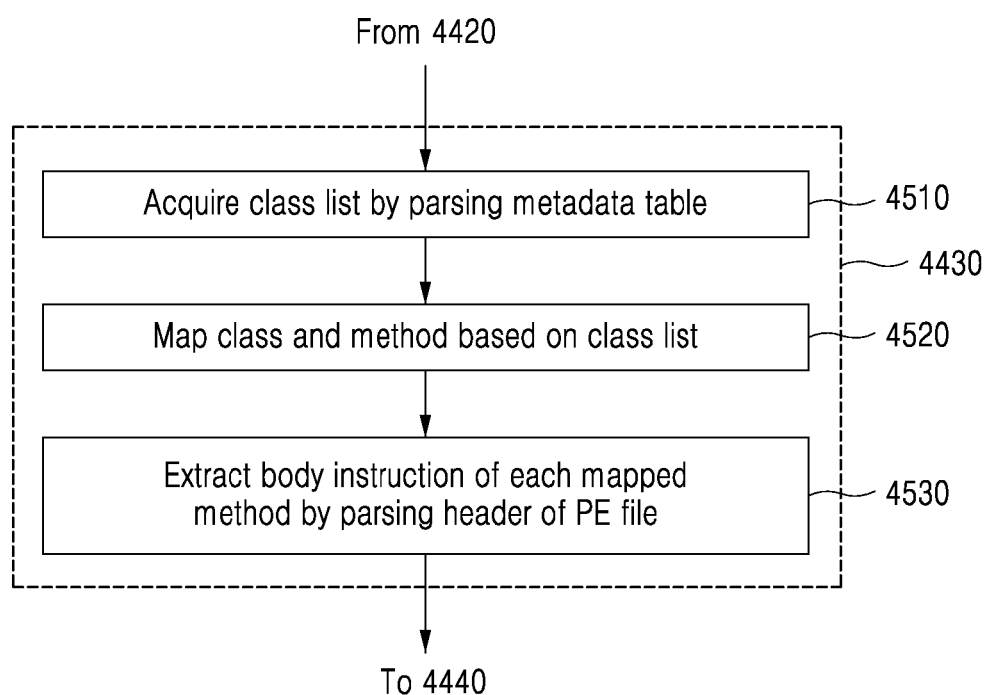
FIG. 45 is a flowchart illustrating an example of a method of extracting a body instruction according to at least one example embodiment.

FIG. 45 is a flowchart illustrating an example of a method of extracting a body instruction according to at least one example embodiment. Operations 4510 through 4530 of FIG. 45 may be included in operation 4430 of FIG. 44 and performed by the body instruction extractor 4330.

Referring to FIG. 45, in operation 4510, the body instruction extractor 4330 may acquire a class list by parsing a metadata table. For example, as described above, the security evaluation system 300 may acquire the class list by parsing/analyzing 'MethodDef' table, 'ModuleRef' table, 'TypeRef' table and 'TypeDef' table from a total of 42 metadata tables included in .Net 2.0, and may map a class and a method. Here, it is apparent that information associated with a class and a method is included in a form of the metadata table in a header of the PE file. It will be easily understood by one of ordinary skill in the art that the body instruction extractor 4330 may acquire information associated with the class and the method by appropriately utilizing information included in the header of the PE file based on a form or a structure of the PE file.

In operation 4520, the body instruction extractor 4330 may map the class and the method based on the class list. For example, if a class A includes method a, method b, and a method c, the body instruction extractor 4330 may map the class A to the method a, the method b, and the method c. If all of the methods a, b, and c are obfuscated or encrypted, the obfuscation or the encryption may be understood to be applied to the class A. The number of obfuscated classes may be determined based on such translation.

In operation 4530, the body instruction extractor 4330 may extract a body instruction of each mapped method by parsing the header of the PE file. Extraction of the body instruction may be processed by searching a text section for a corresponding method based on an RVA indicating a relative address value in a virtual memory of the method.

Figure 46:
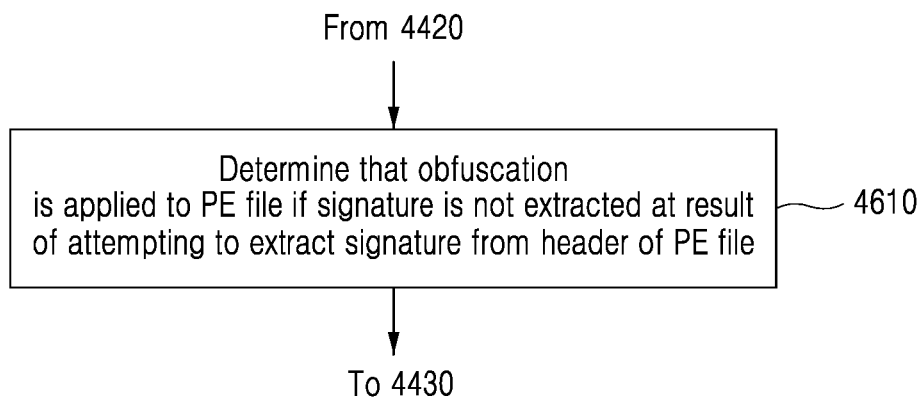
FIG. 46 is a flowchart illustrating an example of a method of determining whether an obfuscation is applied to a PE file according to at least one example embodiment.

FIG. 46 is a flowchart illustrating an example of a method of determining whether an obfuscation is applied to a PE file according to at least one example embodiment. An example in which the entire binary of the PE file is obfuscated or encrypted is described with reference to FIGS. 40 and 41. For example, unlike an ELF file, the PE file such as a .Net file is not loaded by a linker and loaded using a mono file (e.g., mono.so file). Thus, an obfuscation may be applied by encrypting the entire file. Although operation 4610 of FIG. 46 is illustrated to be performed between operations 4420 and 4430 of FIG. 44, operation 4610 may be performed in parallel with other operations after operation 4420. Also, a security evaluation method of another example embodiment including operations 4410, 4420, and 4460 may be implemented.

Referring to FIG. 46, in operation 4610, if a signature is not extracted as a result of attempting to extract the signature from a header of the PE file, the obfuscation determiner 4340 may determine that the obfuscation is applied to the PE file. If the entire binary of the PE file is obfuscated or encrypted, the signature may not be extracted. Accordingly, the obfuscation determiner 4340 may determine whether the obfuscation is applied to the PE file using a simple method of determining whether the signature is extracted. Also, as described above, it is possible to attempt to extract a plurality of predefined signatures and to set and provide a security grade or a dangerous grade through scoring of each of the extracted signatures.

According to some example embodiments, it is possible to objectively analyze and verify a level of security applied to a registered application based on a perspective of each of an obfuscation, a vulnerability, and a security solution, and to provide the analyzed information to be available for security enhancement of the application from a viewpoint of an application publisher. Also, it is possible to determine whether an obfuscation is applied to a dex file included in an APK. Also, it is possible to determine whether an obfuscation is applied to an ELF file. Also, it is possible to determine whether an obfuscation is applied to a PE file.

The systems and or apparatuses described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM, random access memory (RAM, flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of evaluating security of an application, the method comprising:
    storing pattern-information-by-perspective for analyzing a file package based on an obfuscation perspective and a vulnerability perspective;
    registering the file package to be distributed to users for installing and executing an application;
    analyzing the registered file package based on the pattern-information-by-perspective, the analyzing including (1) identifying files included in the registered file package by decomposing the registered file package and (2) identifying a file to be analyzed for each of the obfuscation perspective and the vulnerability perspective based on extensions of the identified files;
    generating first analysis information of the obfuscation perspective and second analysis information of the vulnerability perspective for each file that is identified for a corresponding one of the obfuscation perspective and the vulnerability perspective, based on results of the analyzing;
    providing the first analysis information of the obfuscation perspective and the second analysis information of the vulnerability perspective; and
    verifying and adjusting a level of security applied to the registered file package based on the first and second analysis information,
    wherein the pattern-information-by-perspective includes pattern information of the obfuscation perspective, and the pattern information of the obfuscation perspective includes pattern information for identifying whether an obfuscation is applied with respect to each item from the file that is identified from among the files included in the registered file package based on the obfuscation perspective.

2. The method of claim 1, wherein whether the obfuscation is applied with respect to each item includes whether the obfuscation is applied to each of a method and a class included in the file that is identified based on the obfuscation perspective, and
    the generating comprises,
    identifying the method and the class to which the obfuscation is applied from the file that is identified based on the obfuscation perspective, based on the pattern information of the obfuscation perspective, and
    generating, for each target file, the first analysis information of the obfuscation perspective including (1) a number of methods to which the obfuscation is applied, (2) a number of classes to which the obfuscation is applied, and (3) a dangerous grade determined based on the number of methods to which the obfuscation is applied and the number of classes to which the obfuscation is applied.

3. The method of claim 1, wherein whether the obfuscation is applied with respect to each item includes whether the obfuscation is applied to each piece of information corresponding to at least one item of a section header, a string, a string table, a symbol table, or a code that is included in the file identified based on the obfuscation perspective, and the generating comprises,
- identifying items to which the obfuscation is applied from the file that is identified based on the obfuscation perspective, based on the pattern information of the obfuscation perspective, and
- generating, for each target file, the first analysis information of the obfuscation perspective including (1) a type of an item to which the obfuscation is applied and (2) a dangerous grade determined based on the type of the item to which the obfuscation is applied.

4. The method of claim 1, further comprising:
- generating third analysis information associated with a reference relationship between the files included in the registered file package,
- wherein the providing further provides the third analysis information associated with the reference relationship.

5. The method of claim 1, wherein the registered file package includes Android Application Package (APK), and the generating comprises,
- searching for an application class from a dex file included in the APK,
- verifying whether an Application Programming Interface (API) for loading another dex file further included in the APK is called based on a class and a method that are called from a body instruction included in the application class, and
- determining that the obfuscation is applied to the dex file in response to a result of the verifying associated with the API indicating that the API for loading the another dex file has been called.

6. The method of claim 5, wherein the searching for the application class comprises:
- extracting a class name of the application class from an AndroidManifest.xml file included in the APK; and
- identifying the application class from the dex file based on the extracted class name.

7. The method of claim 5, wherein the verifying associated with the API comprises:
- generating a call list of all of calls in the body instruction of the method included in the application class; and
- verifying whether a class loader class and a load class method are called from the generated call list.

8. The method of claim 1, wherein the generating comprises:
- identifying an Executable and Linkable Format (ELF) file included in the registered file package;
- first-determining whether the obfuscation is applied to at least one of an ELF header, a section header, a section, or a segment included in the ELF file; and
- second-determining a security grade of the ELF file based on a result of the first-determining.

9. The method of claim 8, wherein the generating further comprises setting a normal value range of at least one item among a size of a section header, a number of section headers, and a size of a section that are included in the ELF header, and the first-determining comprises,
- extracting a value of the at least one item from the ELF header, and
- determining that the obfuscation is applied to the ELF header in response to the extracted value being outside the set normal value range.

10. The method of claim 8, wherein the first-determining comprises:
- collecting addresses of functions through an export symbol entry included in a dynamic linking symbol table section (.dynsym section) among sections included in the ELF file;
- extracting a value associated with a size of an execution code from a header of a section (.text section) including the execution code from a section header table included in the ELF file; and
- determining whether the obfuscation is applied to the header of the section (.text section) including the execution code based on (1) the extracted value and (2) the size of the execution code calculated through the collected addresses and the extracted value.

11. The method of claim 1, wherein the generating comprises:
- identifying a Portable Executable (PE) file included in the registered file package;
- extracting a body instruction of a method from a text section included in the PE file by referring to a metadata table included in the PE file; and
- determining whether the obfuscation is applied to the method by analyzing the extracted body instruction.

12. The method of claim 11, wherein the extracting comprises:
- acquiring a class list by parsing the metadata table;
- mapping a class and a method based on the class list; and
- extracting a body instruction of the mapped method by parsing a header of the PE file.

13. The method of claim 11, wherein the determining comprises:
- determining whether the obfuscation is applied to a method corresponding to the extracted body instruction by analyzing matching of an instruction operation code (opcode) included in the extracted body instruction.

14. A non-transitory computer-readable recording medium storing instructions that, when executed by a processor, cause the processor to perform a method of evaluating security of an application, the method comprising:
- storing pattern-information-by-perspective for analyzing a file package based on an obfuscation perspective and a vulnerability perspective;
- registering the file package to be distributed to users for installing and executing an application;
- analyzing the registered file package based on the pattern-information-by-perspective, the analyzing including (1) identifying files included in the registered file package by decomposing the registered file package and (2) identifying a file to be analyzed for each of the obfuscation perspective and the vulnerability perspective based on extensions of the identified files;
- generating first analysis information of the obfuscation perspective and second analysis information of the vulnerability perspective for each file that is identified for a corresponding one of the obfuscation perspective and the vulnerability perspective, based on results of the analyzing;
- providing the first analysis information of the obfuscation perspective and the second analysis information of the vulnerability perspective; and
- verifying and adjusting a level of security applied to the registered file package based on the first and second analysis information,
- wherein the pattern-information-by-perspective includes pattern information of the obfuscation perspective, and the pattern information of the obfuscation perspective includes pattern information for identifying whether an obfuscation is applied with respect to each item from the file that is identified from among the files included in the registered file package based on the obfuscation perspective.

15. A system for evaluating security of an application, the system comprising:
   at least one memory configured to store non-transitory computer-readable instructions;
   at least one processor configured to execute the non-transitory computer-readable instructions such that the at least one processor is configured to,
   store pattern-information-by-perspective for analyzing a file package based on an obfuscation perspective and a vulnerability perspective,
   register the file package to be distributed to users for installing and executing the application,
   analyze the registered file package based on the pattern-information-by-perspective by (1) identifying files included in the registered file package by decomposing the registered file package and (2) identifying a file to be analyzed for each of the obfuscation perspective and the vulnerability perspective based on extensions of the identified files, and
   generate first analysis information of the obfuscation perspective and second analysis information of the vulnerability perspective for each file that is identified for a corresponding one of the obfuscation perspective and the vulnerability perspective, based on a result of the analyzing, and
   provide the first analysis information of the obfuscation perspective and the second analysis information of the vulnerability perspective,
   verify and adjust a level of security applied to the registered file package based on the first and second analysis information,
   wherein the pattern-information-by-perspective includes pattern information of the obfuscation perspective, and
   the pattern information of the obfuscation perspective includes pattern information for identifying whether an obfuscation is applied with respect to each item from the file that is identified from among the files included in the registered file package based on the obfuscation perspective.

16. The system of claim 15, wherein the file package includes Android Application Package (APK), and
   the at least one processor is further configured to,
   search for an application class from a dex file included in the APK, and
   verify whether an Application Programming Interface (API) for loading another dex file further included in the APK is called based on a class and a method that are called from a body instruction included in the application class, and
   determine that the obfuscation is applied to the dex file in response to a result of the verification associated with the API indicating that the API for loading the another dex file has been called.

17. The system of claim 15, wherein the at least one processor is configured to
   identify an Executable and Linkable Format (ELF) file included in the registered file package,
   first-determine whether the obfuscation is applied to at least one of an ELF header, a section header, a section, or a segment include in the ELF file, and
   second-determine a security grade of the ELF file based on a result of the first-determining.

18. The system of claim 15, wherein the at least one processor is further configured to
   identify a Portable Executable (PE) file included in the registered file package,
   extract a body instruction of a specific method from a text section included in the PE file by referring to a metadata table included in the PE file, and
   determine whether the obfuscation is applied to the specific method by analyzing the extracted body instruction.

* * * * *